(12) United States Patent
Chang et al.

(10) Patent No.: US 11,626,136 B1
(45) Date of Patent: Apr. 11, 2023

(54) THREE-STATE SINGLE-PASS RECORDING IN HAMR DEVICE WITH DUAL RECORDING LAYERS

(71) Applicant: Seagate Technology LLC, Fremont, CA (US)

(72) Inventors: Thomas Young Chang, Menlo Park, CA (US); Philip L. Steiner, Los Altos, CA (US); Zengyuan Liu, Eden Prairie, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/565,188

(22) Filed: Dec. 29, 2021

(51) Int. Cl.
*G11B 5/31* (2006.01)
*G11B 20/12* (2006.01)
*G11B 13/08* (2006.01)
*G11B 5/012* (2006.01)
*G11B 5/00* (2006.01)

(52) U.S. Cl.
CPC ............. *G11B 13/08* (2013.01); *G11B 5/012* (2013.01); *G11B 2005/0021* (2013.01)

(58) Field of Classification Search
CPC ......... G11B 5/667; G11B 5/3133; G11B 5/66; G11B 5/70615; G11B 5/70621; G11B 2005/0021; G11B 5/00; G11B 20/12
USPC ..................................................... 360/67, 48
See application file for complete search history.

(56) References Cited

U.S. PATENT DOCUMENTS

| | | | |
|---|---|---|---|
| 5,851,643 A * | 12/1998 | Honda ................. | G11B 5/1278 428/662 |
| 6,049,440 A | 4/2000 | Shu | |
| 8,743,666 B1 | 6/2014 | Bertero et al. | |
| 9,984,709 B1 | 5/2018 | Huang et al. | |
| 10,636,444 B2 * | 4/2020 | Chang ................. | G11B 5/3133 |
| 10,803,896 B1 | 10/2020 | Mohl | |
| 2002/0192506 A1 | 12/2002 | Coffey et al. | |
| 2004/0136107 A1 | 6/2004 | Sugimoto | |
| 2010/0110576 A1 | 5/2010 | Akagi et al. | |
| 2011/0109984 A1 * | 5/2011 | Jubert ...................... | G11B 5/02 |
| 2011/0141868 A1 | 6/2011 | Mahnad | |
| 2014/0093747 A1 * | 4/2014 | Marinero ........... | G11B 5/73913 428/828 |
| 2015/0132608 A1 | 5/2015 | Kataoka et al. | |
| 2016/0012863 A1 | 1/2016 | Kikitsu et al. | |
| 2016/0148632 A1 | 5/2016 | Hellwig et al. | |
| 2019/0027173 A1 | 1/2019 | Ding et al. | |

* cited by examiner

*Primary Examiner* — Nabil Z Hindi
(74) *Attorney, Agent, or Firm* — Holzer Patel Drennan

(57) ABSTRACT

A heat-assisted magnetic recording (HAMR) device is configured to write regions of neutral polarity on a magnetic media during a same pass of the recording head in which other regions are written of positive polarity and negative polarity. The various disclosed write techniques may facilitate creation of "zero state" (substantially net zero polarity) transition zones between each pair of data bits of opposite polarity and/or may facilitate the encoding of three different logical states (e.g., 1, 0, and −1) on the media.

20 Claims, 15 Drawing Sheets

THREE-STATE SINGLE-PASS RECORDING IN HAMR DEVICE WITH DUAL RECORDING LAYERS

BACKGROUND

Conventional magnetic media encode magnetic bits with positive and negative polarity to store data corresponding to the two distinct binary states (1 and 0). However, other types of media, such as flash, are able to utilize multi-level cells to encode more than two logical states. For example, a 2-level multi-level flash cell may be programmed to store four different logical states corresponding to the programmed pairs of values [1, 0], [0,0], [1, 1], and [0,1], which radically improves storage densities as compared to single-level cells that store only a 1 or a 0. In magnetic storage devices, it is theorized that areal storage density capacity (ADC) could be improved by as much as 58% if a magnetic media could be used to store 3 distinct logical states (e.g., −1, 1, and 0).

Although some approaches to tri-state magnetic recording have been previously proposed, existing solutions have significant shortcomings. One existing approach utilizes a single-layer recording media and encodes a zero polarity state by performing what is known as AC erase. Per this approach, 1 and −1 are encoded by magnetizing bits with positive and negative polarity while the zero state is created by rapidly pulsing the write current between positive and negative polarity within a single bit such that about half the magnetic grains in the bit are positively magnetized and about half are negatively magnetized leading to a net bit magnetization of approximately zero. Current implementations of this approach suffer from noise that is high enough that net ADC gains have not yet been realized.

Another existing approach to tri-state magnetic recording utilizes a dual-pass write process to encode data on a dual-layer recording media in a heat-assisted magnetic recording (HAMR) device. Per this approach, each layer is designed with significantly different Curie temperature to enable writing of each individual layer one at a time by altering the recording temperature on different passes of the head to target writing of the magnetic reversals in two different layers of the storage media. However, since the different stacked layers of the recording media are written during different passes of the write head, it takes two full revolutions of the disc to encode a single data bit. Consequently, this approach significantly increases writing time and is also plagued by a host of other problems such as increased noise (due to head misalignment on the second pass), and unintentional adjacent track overwrite.

SUMMARY

According to one implementation, a HAMR recording device is configured to implement a single-pass recording process that facilitates recording of data bits of three logical states on a single pass of a write element over an underlying data track. The three logical states include a "zero state" that is characterized by stacked layers of opposing polarity such that the polarity of individual grains that form the zero state data bit is substantially zero.

According to another implementation, a HAMR device is configured to create regions of neutral polarity at boundaries between each pair of adjacent data bits having opposite polarity. The regions of neutral polarity are created on a same pass of the read/write head as the pass that writes the data to the adjacent data bits. The regions of neutral polarity are created by altering a polarity of magnetic grains in one of two stacked recording layers of the region after fixing a polarity of corresponding magnetic grains in another one of the two recording layers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

According to one implementation, the herein disclosed technology facilitates a single-pass write of three different logical states to various data bits along a data track of a magnetic media. The magnetic media has two stacked magnetic recording layers with a break layer in between that has different characteristics in the various implementations disclosed herein. Each data bit includes magnetic grains that are vertically stacked in a lower recording layer and an upper recording layer. A first logical state (e.g., 1) is encoded by magnetizing stacked grains in the upper and lower recording layers of the data bit to assume a positive polarity. A second logical state (e.g., −1) is encoded by magnetizing stacked grains in the upper and lower recording layers of the data bit to assume a negative polarity. A third logical state, referred to herein as the "zero state", is encoded by magnetizing individual grains in the upper recording layer of a data bit to have a polarity that is opposite that of the corresponding stacked grains in the lower recording layer of the data bit. As used herein, the terms "zero state" and "neutral polarity" are used to refer to localized areas of magnetic grains that, when read back from the media, are interpreted as having a net polarity of zero or substantially zero. An area may be understood as having "substantially zero" polarity when the readback signal of the HAMR device is within +/−10 percent of zero.

According to another implementation, write techniques disclosed herein are used to create neutral polarity transition zones at the boundaries between directly adjacent data bits of opposite polarity. For example, between each 1 and −1 data bit, there is a narrow zone of magnetic grains with substantially zero polarity. Because these regions are much smaller in width than the size of a data bit, they do not serve as data bits and are referred to herein as neutral polarity transition regions rather than zero state data bits. These regions help to provide crisp, readily-distinguishable boundaries between regions of positive and negative polarity and therefore dramatically improve signal-to-noise (SNR) ratios when included in both conventional magnetic (e.g., 2-state) recording systems and the proposed 3-state recording systems disclosed herein.

Figure 1:
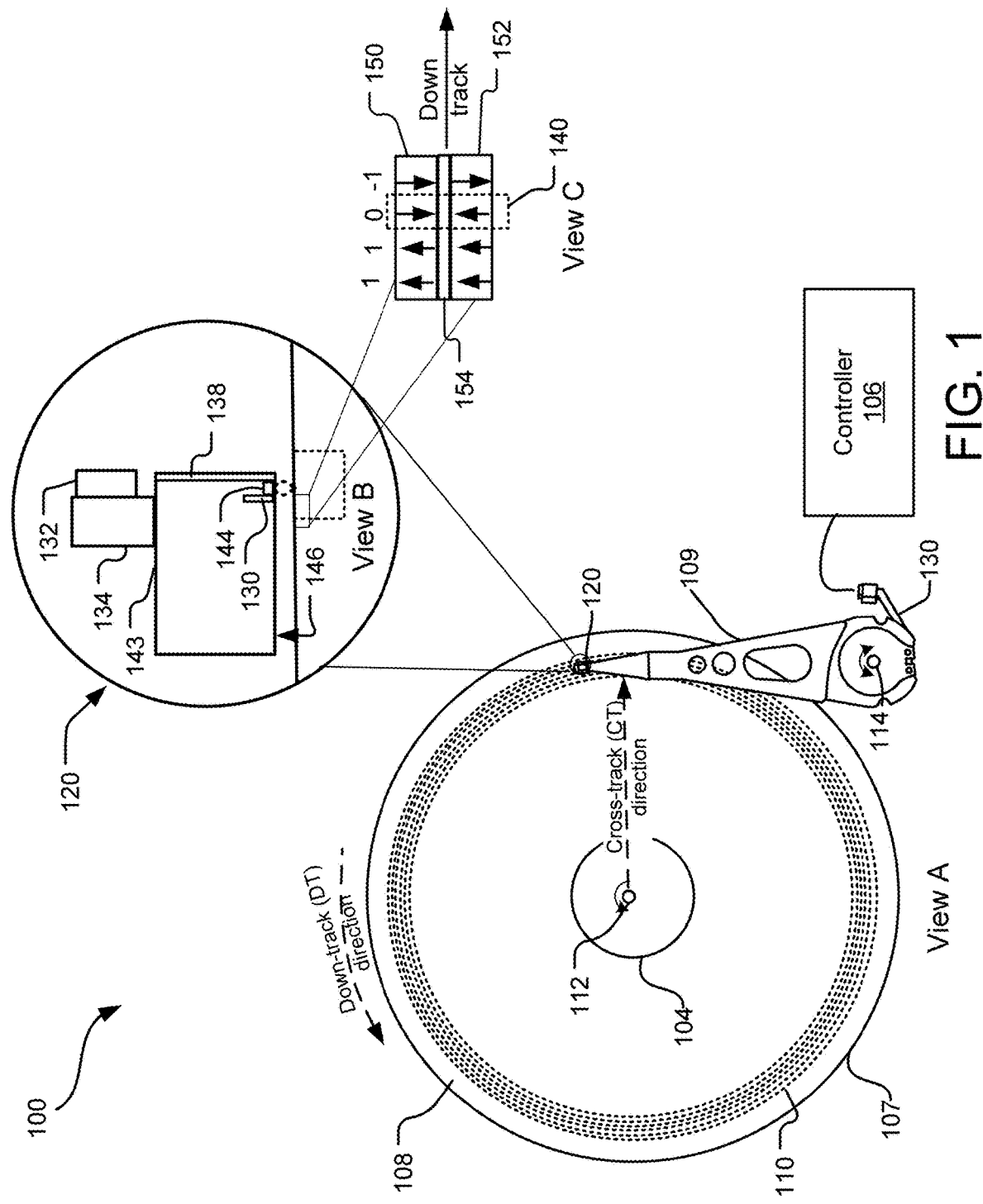
FIG. 1 illustrates a data storage device including a read/write head assembly for writing data on a magnetic storage medium.

FIG. 1 illustrates a data storage device 100 including a read/write head assembly 120 for writing data on a magnetic storage medium 108. The magnetic storage medium 108 is a magnetic storage disc on which data bits can be recorded and read using read and write elements on a read/write head assembly 120. As illustrated in View A, the magnetic media 108 includes an inner diameter 104 and an outer diameter 107 between which are a number of concentric data tracks (e.g., a data track 110) along which data may be written to and read from at respective bit locations as the magnetic media 108 rotates about a spindle center or a disc axis of rotation 112.

The read/write head assembly 120 is mounted on an actuator assembly 109 at an end distal to an actuator axis of rotation 114. The read/write head assembly 120 flies in close proximity above the surface of the magnetic media 108 during disc rotation. The actuator assembly 109 rotates during a seek operation about the actuator axis of rotation 112, which positions the read/head assembly 120 over a target data track for read and write operations.

The read/write head assembly 120 is a heat-assisted magnetic recording (HAMR) head that includes a heat source applied to a bit location on the magnetic media 108 during recording. By temporarily heating the magnetic media 108 during the recording process, the magnetic coercivity of the magnetic grains in the magnetic media 108 can be selectively lowered below an applied magnetic write field in a tightly focused area of the magnetic media 108 that substantially corresponds to an individual data bit. The heated region is then encoded with the recorded data bit based on the polarity of the applied magnetic write field. After cooling, the magnetic coercivity substantially returns to its pre-heating level, thereby stabilizing the magnetization for that data bit. After being recorded, such data bits can be read using a magneto-resistive read head.

Referring to View B, the read/write head assembly 120 includes, among other features, a heat source 132 (e.g., a laser) coupled to a submount assembly 134. Light from the heat source 132 is directed into a waveguide 138 mounted to a slider 143. Light exiting the waveguide is focused, via a Near Field Transducer (NFT) 144, and applied to a bit location on the magnetic media 108 while the bit location is subjected to a magnetic field generated by the write element 130. As an air-bearing surface 146 of the read/write head assembly 120 "flies" across the surface of the magnetic media 108, the write element 130 selectively magnetizes the underlying magnetic grains of the magnetic media 108.

A controller 106 generates control signals to control power to the write element 130 and to control the polarity of the magnetic field generated by the write element 130. In one implementation, the controller 106 controls the write element 130 to encode data bits of three logical states on a single pass of the write element 130 over a data track on the magnetic media. That is, the write element encodes data bits with positive magnetic polarity (1), data bits with negative magnetic polarity (−1), and data bits with approximately zero net magnetization. Referring to View C, the magnetic media 108 is shown to include at least two magnetic recording layers, an upper recording layer 150 and a lower recording layer 152, which both include magnetic material, such as FePt or an alloy thereof. An interface layer 154 separates the upper recording layer 150 and the lower recording layer 152 and may have different properties in different implementations, examples of which are discussed in detail herein.

In one implementation, the upper recording layer 150 and the lower recording layer 152 include granular magnetic material (e.g., material having magnetic grains separated from one another by non-magnetic material). During a manufacturing process, the individual grains in the upper recording layer 150 are grown on top of corresponding individual grains of the lower recording layer 152. In at least one implementation, the magnetic grains in the upper layer are each aligned, in a 1-to-1 configuration, with a corresponding single grain in the lower layer. The magnetic grains in both layers may be substantially the same in size (e.g., within +/−10% of one another) such that boundaries between the magnetic grains in the lower recording layer 152 substantially align with boundaries between the grains in the upper recording layer 150 (e.g., grain centers are aligned within +/−10%).

View C illustrates four data bits that have been written in sequence during a single pass of the read/write head assembly 120 over the media. Each data bit is represented by a pair of vertically stacked arrows that further represents multiple magnetic grains in a tightly focused area. From left to right, View C shows a sequence of data bits in the corresponding states 1, 1, 0, and −1. The '1' state data bits each have a positive polarity — that is, substantially all grains in the upper recording layer 150 and in the lower recording layer 152 of the data bit are fixed to have a positive polarity. The '−1' state data bits each have a negative polarity, meaning that substantially all grains in the upper recording layer 150 and the lower recording layer 152 are fixed to have a negative polarity. The '0' state data bit (e.g., in a region 140) has a polarity of substantially zero due to the fact that each grain in the upper recording layer 150 is fixed to have polarity that is opposite that of a corresponding (stacked) magnetic grain in the lower recording layer 152. In View C, the illustrated '0' state data bit is shown to have a negative polarity in the upper recording layer 150 and a positive polarity in the lower recording layer 152. While it may be the case that all grains in the upper layer of the data bit have negative polarity and all grains in the lower layer of the data bit have positive polarity, it is to be appreciated that this is just one example of magnetic grain orientation that results in substantially zero net polarity within the region 140. Other examples are discussed herein.

The term "substantially zero polarity" is used herein to refer to regions where the individual grains have true substantially net zero polarity (e.g., each grain has an upper layer portion with a polarity opposite in magnitude and sign of that of a corresponding lower layer portion). However, "substantially zero polarity" is also intended to encompass the scenario where the magnetic and/or physical characteristics of the two recording layers are tuned such that the read element on the read/write head assembly 120 detects substantially zero polarity in a given region when the true net polarity of the region is somewhat greater or less than substantially zero. Since the upper recording layer 150 is in closer proximity to the read/write head assembly 120 than the lower recording layer 152, the lower recording layer 152 may contribute less to the readback signal than the upper recording layer 150. Consequently, there exist real-world scenarios where the net polarity of a region could actually be zero but where the read element nevertheless detects a non-zero signal. To adjust for this effect, some implementations of the disclosed technology may provide for tuning of the lower recording layer 152 to have an Mrt (magnetic saturation times the layer thickness) that is greater than the Mrt of the upper recording layer 150 to ensure that the read element detects substantially zero net polarity in the zero state regions. In these cases, the "zero state" regions on the media may have a true polarity biased toward that of the lower recording layer 152 (due to its greater Mrt), but an effective polarity that is detected by the read element as being zero or substantially zero. This tuning of Mrt may be performed with respect to any of the implementations disclosed herein.

According to the various implementations disclosed herein, the three logical states illustrated in View C may all be written—in entirety—during a single pass of the read/write head above the rotating magnetic media 108. Techniques for accomplishing this are discussed with respect to the following figures.

The herein disclosed "zero state" write techniques may also be utilized to insert small areas of neutral polarity between positive and negative data bits in either a conventional recording process (e.g., one that performs binary state recording) or a recoding process using the 3-state recording techniques disclosed herein. By inserting small areas of zero net polarity along the boundaries between data bits, signal to noise can be dramatically improved.

Figure 2:
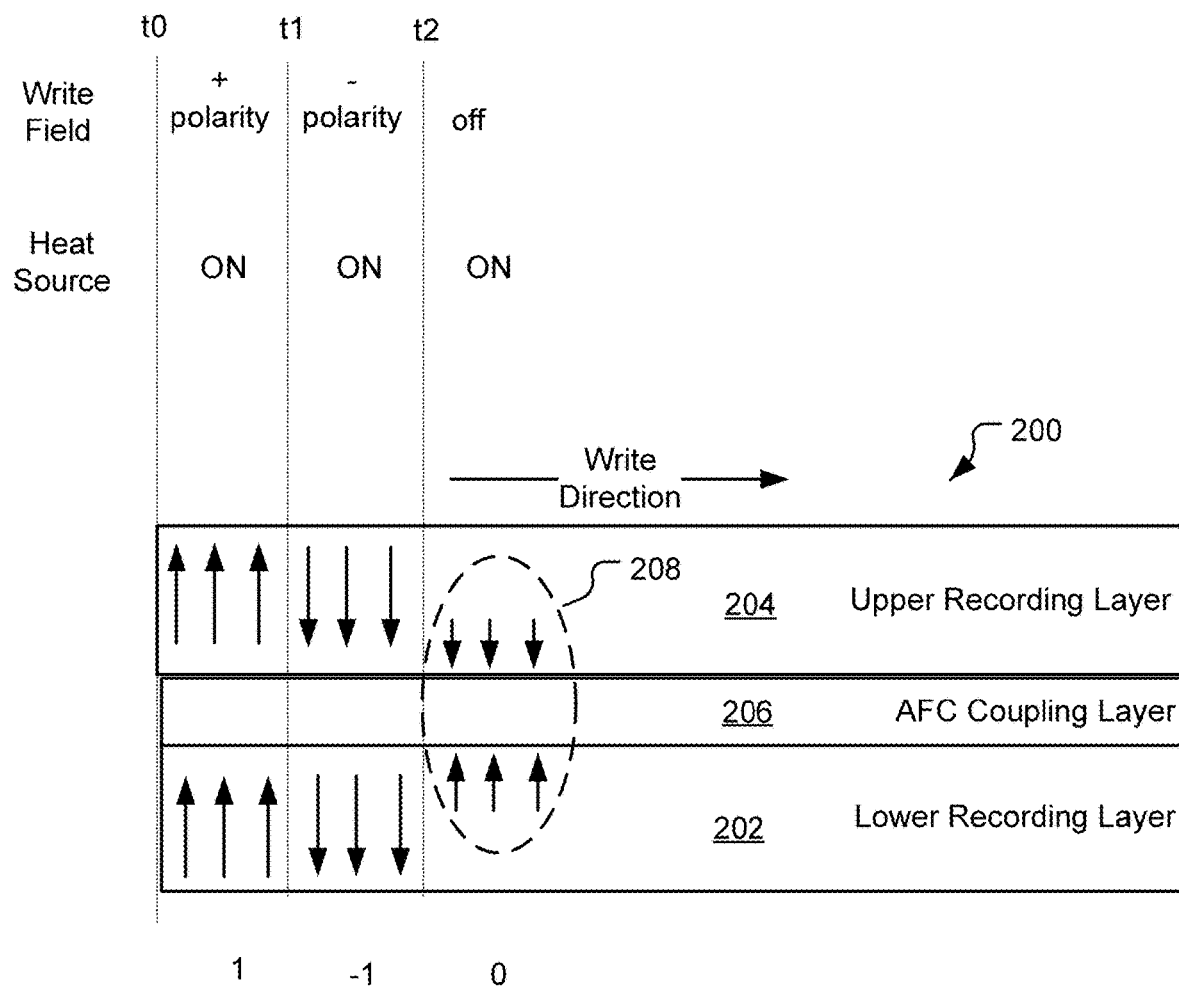
FIG. 2 illustrates an example magnetic media that facilitate writes of zero-state polarity to localized regions on a magnetic media in a HAMR device.

FIG. 2 illustrates an example magnetic media 200 that may facilitate writes of zero-state polarity to localized regions of magnetic grains in a HAMR device. The magnetic media 200 includes at least a lower recording layer 204, an upper recording layer 202, and an antiferromagnetic coupling (AFC) layer 206. In this implementation, the lower recording layer 204 and the upper recording layer 202 both comprise a recording material (e.g., FePt or an alloy thereof) and may have the same or different magnetic characteristics (e.g., Curie temp, Hk, same anisotropy). The AFC layer 206 is a thin metal insertion layer that facilitates a weak anti-ferromagnetic coupling between the upper recording layer 202 and the lower recording layer 204. In the absence of an applied magnetic field, the anti-ferromagnetic coupling causes magnetic grains in the upper recording layer 202 to align with opposite polarity along the interface to the AFC layer 206, as shown in region 208.

In FIG. 2, timesteps t0, t1, and t2 illustrate states of a heat source and of a write field applied by a write element that are effective to write corresponding logical states 1, −1, and 0 (from the left to right) on the data bits of the magnetic media 200. At time t0, the heat source is in the "ON" state and the applied write field has a positive polarity. As the magnetic media 200 cools in the presence of the applied positive-polarity magnetic field, the magnetization in the upper recording layer 202 and the lower recording layer 204 align to the same direction as the applied field as it cools and maintains the positive polarity due to the high anisotropy of the FePt grains within the individual layers.

At time t1, the heat source is in the "ON" state and the applied write field is switched to a negative polarity. As the magnetic media 200 cools in the presence of the applied negative-polarity magnetic field, the magnetization in the upper recording layer 202 and the lower recording layer 204 align to the same direction as the applied field as it cools and maintains the negative polarity due to the high anisotropy of the FePt grains within the individual layers.

At time t2, the heat source is left in the "ON" state but the write field is switched off. In this case, the magnetic grains in the underlying region are heated but not subjected to a magnetic field. As the grains in this region cool, there is a small amount of AFC configuration (e.g., opposing polarity grains) that start to form near the interface to the AFC layer 206. As cooling continues, the opposing polarity within these grain is frozen due to the high anisotropy of FePt grains. This effect drives the net magnetization of the individual grains within the corresponding data bit close to zero.

In one implementation, the AFC layer 206 is an extremely thin (sub nanometer) paramagnetic layer that has upper and lower interfaces to promote granular formation within the upper recording layer 202 that provides spatial continuity with the underlying grains in the lower recording layer 204 such that upper and lower grains are stacked in a 1:1 ratio with grain boundaries approximately aligned. In addition, the AFC layer 206 is resistant to high temperatures in the sense that it can withstand the high temperature deposition process of the upper recording layer 202 without being prone to interlayer diffusion.

Whereas the implementation of FIG. 2 utilizes a weak AFC coupling field to create regions of net zero polarity (e.g., region 208), FIGS. 3-13 illustrate alternate embodiments that rely on differences in magnetic characteristics between the two stacked magnetic recording layers to generate regions of zero state polarity. Among other characteristics, these embodiments provide for a lower Curie temperature in one of the recording layers than the other. In the examples disclosed herein, the upper recording layer is the layer that has the lower Curie temperature. However, it can be appreciated that the same effects disclosed herein (e.g., magnetic grain reversals isolated to a single layer) could be realized using a media in which the lower layer has the lower Curie temperature. Thus, although the terms "upper layer" and "lower layer" are used consistently herein, there exists another implementation of the disclosed technology in which the magnetic characteristics of these two layers are reversed.

The Curie temperatures and anisotropy of the two layers are such that there exists (1) a first, higher temperature range conducive to facilitating magnetic reversals in both layers and (2) a second, lower temperature range that is conducive to facilitating magnetic reversals in the upper recording layer and not in the lower recording layer.

In these implementations described below, the zero state polarity is achieved by selectively leveraging grain polarity reversals that occur when the media is heated by different portions of a recording head of the HAMR device. When a high temperature region of the recording head passes over a data bit, magnetic reversal may be realized in both magnetic layers. However, when a trailing lower temperature region of the recording head subsequently passes over the data bit, further magnetic reversals may be realized in the upper recording layer while the magnetic grains in the lower recording layer remain fixed in polarity. Consequently, the grains in the upper recording layer may be magnetically aligned in a direction opposite that of the corresponding grains in the lower recording layer. This effect is explored with respect to the following figures.

Figure 3:
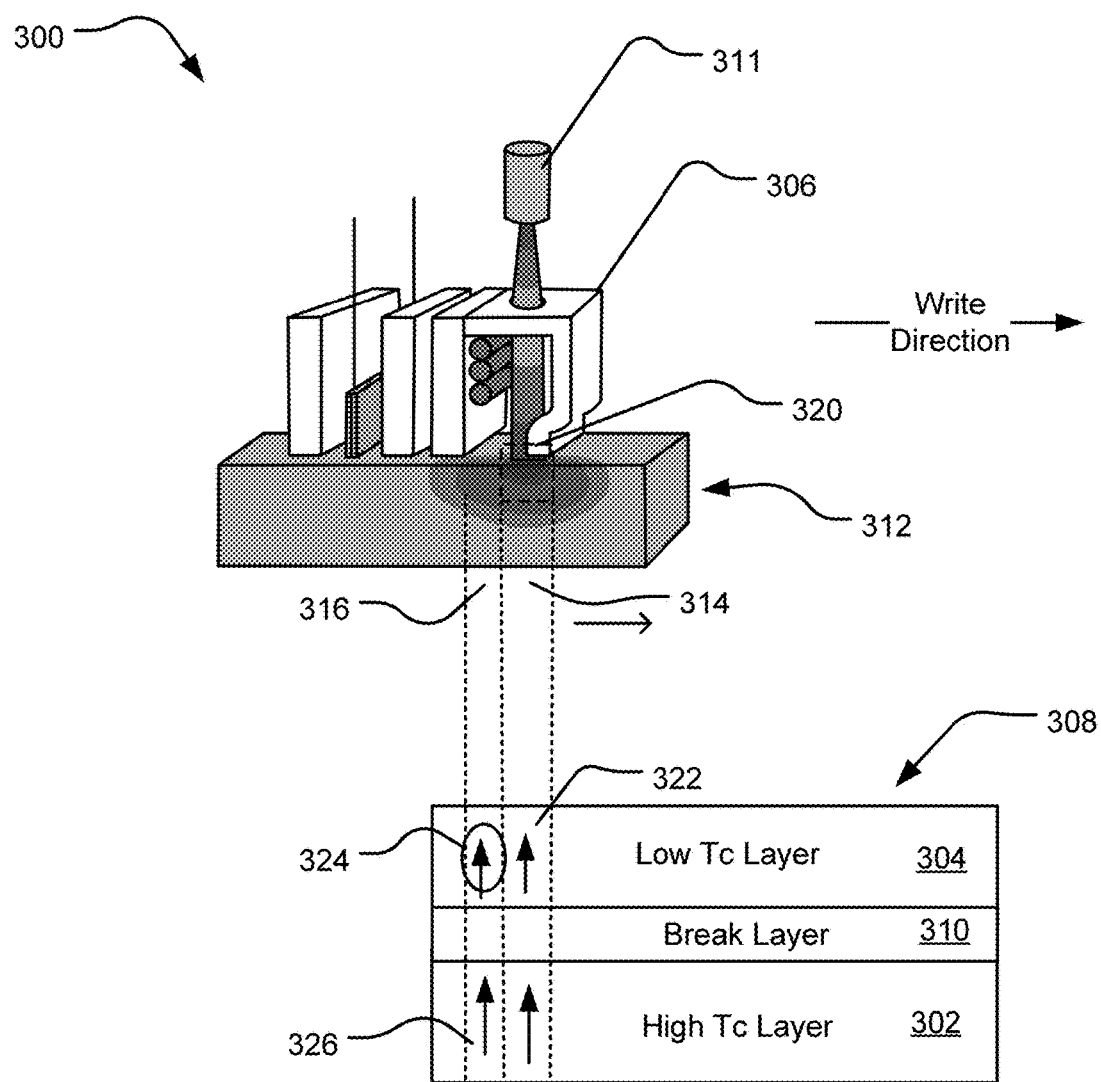
FIG. 3 illustrates aspects of an example HAMR device that writes regions of zero-state polarity by leveraging different thermal magnetic characteristics of an upper recording layer and a lower recording layer.

FIG. 3 illustrates aspects of an example HAMR device 300 that writes regions of zero-state polarity by leveraging different thermal magnetic characteristics of an upper recording layer and a lower recording layer to selectively cause certain magnetic reversals to be isolated to the upper recording layer while causing other magnetic reversals to simultaneously occur in both the upper recording layer and the lower recording layer. In FIG. 3, the lower recording layer has a higher Curie temperature than the upper recording layer (e.g., the layer closest to the write element). For this reason, the lower recording layer is referred to as a high Tc layer 302 while the upper recording layer is referred to as a low Tc layer 304.

As a write element 306 flies above a rotating underlying magnetic media 308, a laser 311 heats a tightly localized underlying region of the magnetic media 308. The laser 311 generates a thermal profile 312 that moves along a data track while data is being recording to the track. The thermal profile 312 varies according to a heat gradient having a highest temperature underlying the NFT 320 and temperature that decreases with distance from the NFT 320. While the thermal profile 312 moves along the plane of the magnetic media 308, a higher temperature zone 314 exists near the center of the thermal profile 312 (e.g., at least partially underlying an NFT 320) while a lower temperature zone 316 trails the higher temperature zone 314.

The magnetic media 308 has characteristics such that the higher temperature zone 314 is within a temperature range sufficient to facilitate magnetic reversals in both the low Tc Layer 304 and the high Tc layer 302 in the presence of an applied magnetic field. In contrast, the lower temperature zone 316 is within a temperature range is sufficient to facilitate magnetic reversals in the low Tc Layer 304 but not in the high Tc layer 302 in the presence of the applied magnetic field. Due to this, a magnetic grain in the low Tc layer 304 can be recorded for a longer period of time (e.g., as it passes beneath the NFT 320) than its corresponding (stacked) magnetic grain in the high Tc Layer 302. That is, magnetic grains in the low Tc layer 304 can be recorded when passing through both the higher temperature zone 314 and the lower temperature zone 316 while magnetic grains in the high Tc layer 302 can only be written to when passing through the higher temperature zone 314.

By example and without limitation, grains in a region 324 may be initially recorded at the positive polarity state when passing through the higher temperature zone 314 (which simultaneously causes magnetic reversals in the underlying region 326). Once the region 324 moves into the lower temperature zone 316, grains within the region 324 can be recorded without affecting the polarity of grains in the underlying region 326. If, for example, the polarity of the magnetic field is switched as the region 324 moves from the higher temperature zone 314 to the lower temperature zone 316, the region 324 may have data bits that are fixed in a magnetic state opposite that of the underlying grains in the region 326.

In FIG. 3, the low Tc layer 304 and the high Tc layer 302 are separated from one another by a break layer 310. In one implementation, the break layer 310 is a non-magnetic layer thick enough to fully decouple the low Tc layer 304 from the high Tc layer 302 at room temperature. The break layer 310 may, for example, comprise a dielectric material, Ruthenium, pure platinum, chromium, or cobalt-chromium.

Like the AFC coupling layer described with respect to FIG. 2, the break layer 310 is, ideally, a material that provides upper and lower interface characteristics that promote order L10 lattice growth within the top layer (the low Tc layer 304). In one implementation, the decoupling layer is also a material that provides spatial continuity with the underlying and overlying magnetic grains such that upper and lower grains are stacked in a 1:1 ratio with grain boundaries approximately aligned. In addition, the break layer 310 may comprise material with high thermal stability such that it can withstand a high temperature deposition process of the low Tc layer 304 without being prone to interlayer diffusion.

Figure 4:
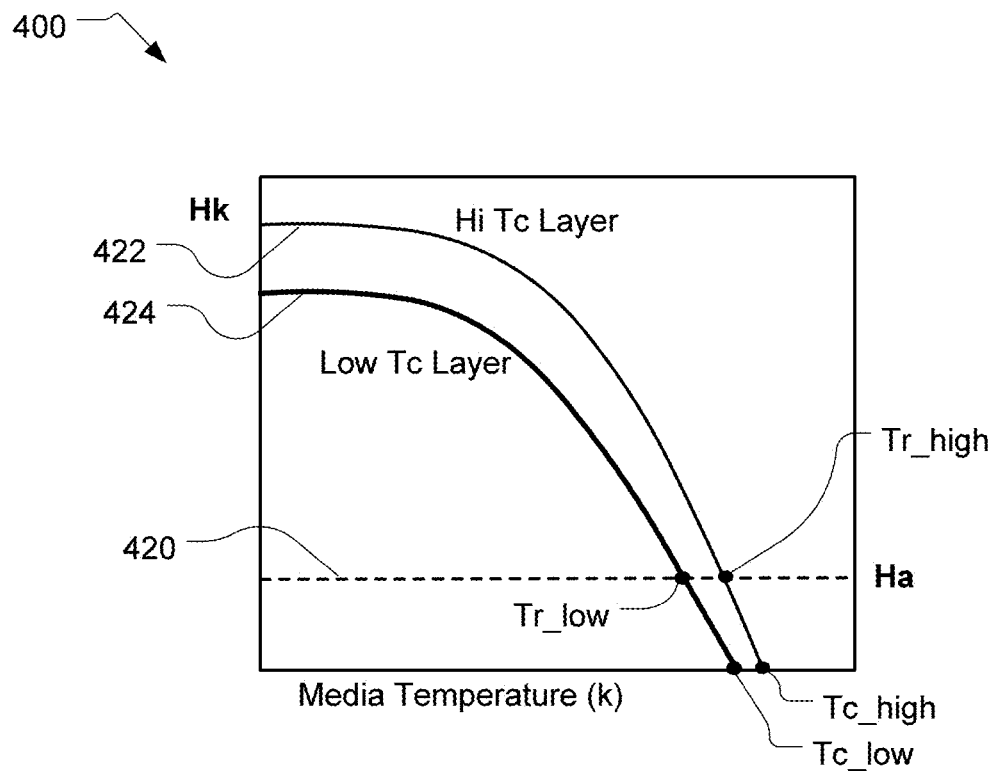
FIG. 4 illustrates characteristics of another example magnetic media suitable for implementing the techniques discussed above with respect to FIG. 3.
Figure 4:
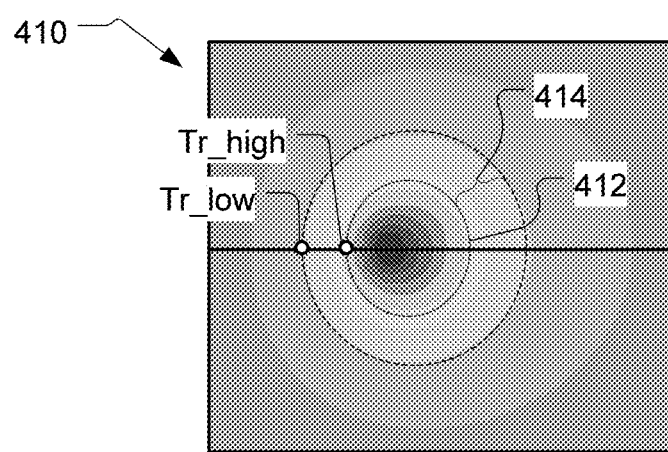

FIG. 4 illustrates a plot 400 and thermal profile 410 showing characteristics of a HAMR device media suitable for implementing the techniques discussed above with respect to FIG. 3. The HAMR device includes a magnetic media (not shown) with a structure the same or similar to that shown in FIG. 3, including dual recording layers, where the lower recording layer further from the write element has a higher Curie temperature than the upper recording layer closer to the write element. The lower recording layer and the upper recording layer are separated by a break layer that may have characteristics the same or similar to those discussed above with respect to FIG. 3.

The plot 400 illustrates example thermal characteristics of the media layers as well as recording temperatures employed within the HAMR device. Here, a horizontal line 420 illustrates a magnitude of a write field (Ha) applied as the layers of the media undergo changes in magnetic anisotropy and temperature. A first line 422 illustrates trends in these characteristics for the high Tc layer and a second line 424 illustrates trends in these characteristics for the low Tc layer. A point labeled "Tc_high" marks the Curie temperature of the high Tc layer (lower layer) while a point labeled "Tc_low" marks the Curie temperature of the low Tc Layer (upper layer).

For each of the high Tc layer (lower layer) and the low Tc layer (upper layer), there exists a distinct temperature range in which magnetization reversals can occur in the presence of an applied magnetic field (Ha). Between Tr_high and Tc_high, magnetic reversals are possible for the high Tc layer (lower recording layer). Between Tr_low and Tc_low, magnetic reversals are possible for the low Tc layer (upper recording layer).

These temperatures ranges depend upon the anisotropy (Hk) and the Curie temperature of the material in each layer. In general, magnetic reversals of individual grains cannot occur above a layer's Curie temperature. As the material cools down below the Curie temperature, the magnetic moment of the material gradually increases while, at the same time, the magnetic field required to flip the direction of the moment from its current orientation increases. Therefore, if the layer is in the presence of a magnetic field when its temperature drops below the Curie temperature of the layer, the layer will be magnetized in the direction of the applied field and the layer's magnetic moment will increase (locking in the magnetization) as the layer cools. If the direction of the applied field is then reversed while the same layer continues to cool, the developed magnetic moment then switches to the direction of the newly applied field provided that the layer's anisotropy (Hk) has not yet increased beyond the strength of the applied field.

If a given one of the layers has cooled enough that the layer's Hk is larger than the applied field at the time of the field reversal, the moment will not be switched and the previous magnetization direction is "frozen in." If, however, the temperature is still high enough that the Hk of the material is still less than the applied field, then whatever moment has developed will switch to the new applied field direction.

Given that for any magnetic materials, it is possible to readily determine a corresponding temperature range in which magnetization reversals are possible, it is also possible to select materials for magnetic recording layers that allow for a "matching" of these temperature ranges to temperature zones within a thermal profile created by a recording head in a HAMR device to realize the 3-state recording techniques disclosed herein.

For example, a top-down thermal profile 410 created by the HAMR write element includes a higher temperature zone 412 bounded by a contour line at the temperature Tr_high and a lower temperature zone 414 bounded by a contour line at the temperature Tr_low. When a magnetic grain is heated to the temperature Tr_high, magnetic reversals may be realized in both the high Tc layer and the low Tc layer. When a magnetic grain is heated to the temperature Tr_low, magnetic reversals may be realized in the low Tc layer but not in the high Tc layer. Therefore, as a data bit travels through the thermal profile 410, both the recording layers can be written at Tr_high. However, by the time the data bit reaches Tr_low, the magnetization of the high Tc layer is "locked in" while the magnetization of the low Tc layer is still subject to change.

FIGS. 5A-5D illustrate operations performed by a HAMR device having the characteristics described with respect to FIGS. 3 and FIG. 4. That is, the HAMR device includes a magnetic media with dual recording layers including a low Tc layer 502 and a high Tc layer 504 separated by decoupling layer 510. The HAMR device includes a recording media that generates a thermal profile 512 with characteristics the same or similar to that described with respect to FIG. 4 relative to the temperature zones in which reversals are possible for each of the two layers. This thermal profile 512 includes a higher temperature zone 514 and a lower temperature zone 506. An outer edge of the higher temperature zone 514 corresponds to a recording temperature Tr_high and an outer edge of the lower temperature zone 506 corresponds to a recording temperature Tr_low, where Tr_low and Tr_high may be defined as in FIG. 4.

Figure 5A:
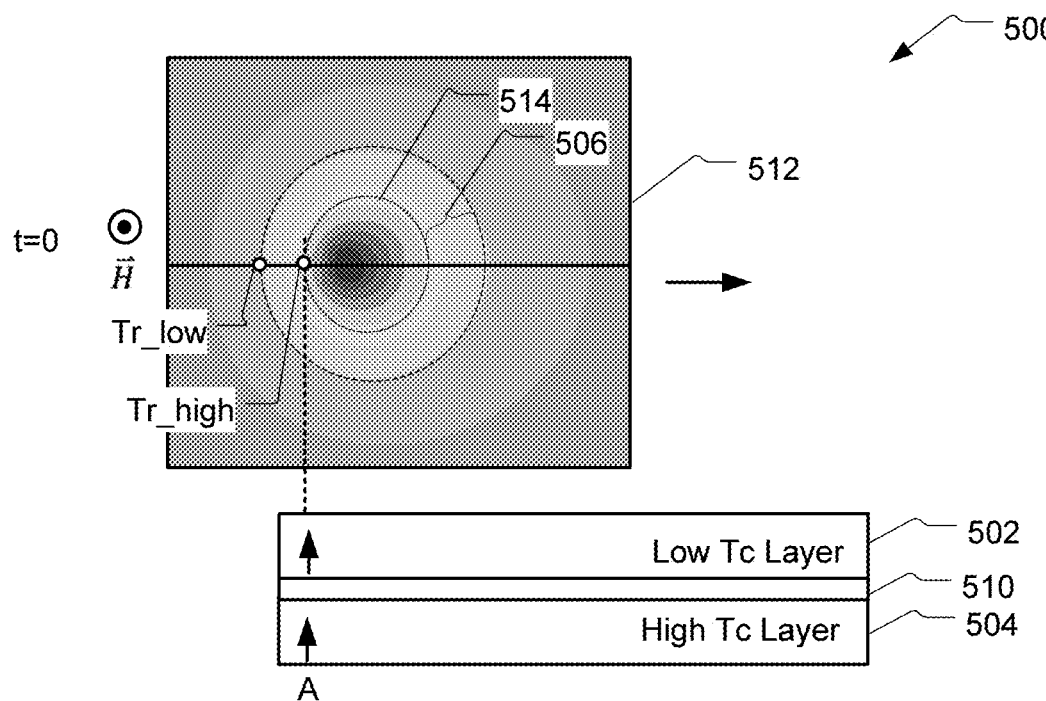
FIG. 5A illustrates a cross-sectional view of media layers during a first example recording operation in a HAMR device that writes regions of neutral polarity to a magnetic media.

FIG. 5A illustrates cross-sectional view of media layers during a first example recording operation 500 for writing a zero-state data bit in a HAMR device. Here a first localized region 'A' is passing through the higher temperature zone 514 of the media and is cooling to a temperature Tr_high while a positive polarity magnetic field is applied. Since the temperature Tr_high is (e.g., as shown with respect to FIG. 4) sufficient to facilitate magnetic reversals in both the low Tc layer and the high Tc layer of region 'A', magnetic grains are positively polarized in both layers.

Figure 5B:
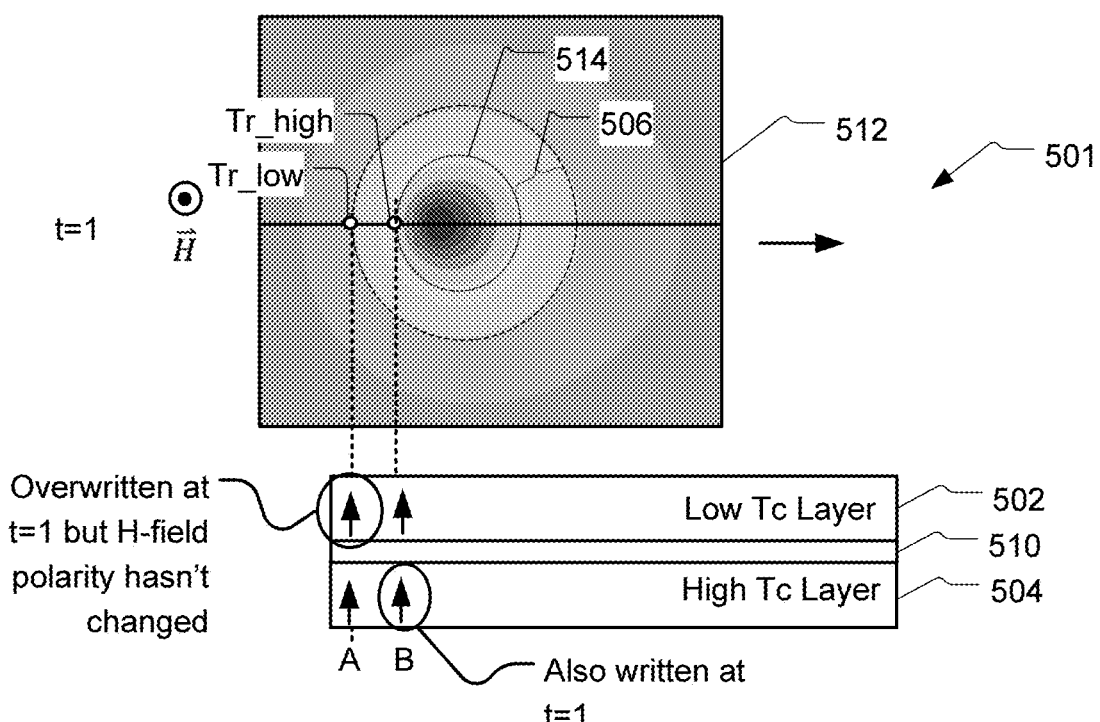
FIG. 5B illustrates a cross-sectional view of the media layers of FIG. 5A during a second example recording operation.

FIG. 5B illustrates a second example recording operation 501 following that of FIG. 5A. Here, the media has rotated slightly such that the read/write element has shifted in the down-track position relative to the magnetic media and the heat element is now positioned over another localized region "B." Since the positive write field is still being applied, the magnetic moment of the grains within the low Tc layer and the high Tc layer of region B are again rotated to align with the positive write field. At this same point in time, the localized region "A" that was previously written per the operations illustrated in FIG. 5A is now located within the lower temperature zone 506 of the thermal profile 512. The temperature of region "A" is cooling toward the temperature Tr_low, which is sufficient to facilitate magnetic reversals in the low Tc layer 502 but not in the high Tc layer 504. Thus, at Tr_low, the grains in the upper layer of region "A" have the potential to be overwritten (e.g., flipped and locked in). However, since the field direction has not actually changed, this region maintains its positive polarity.

Figure 5C:
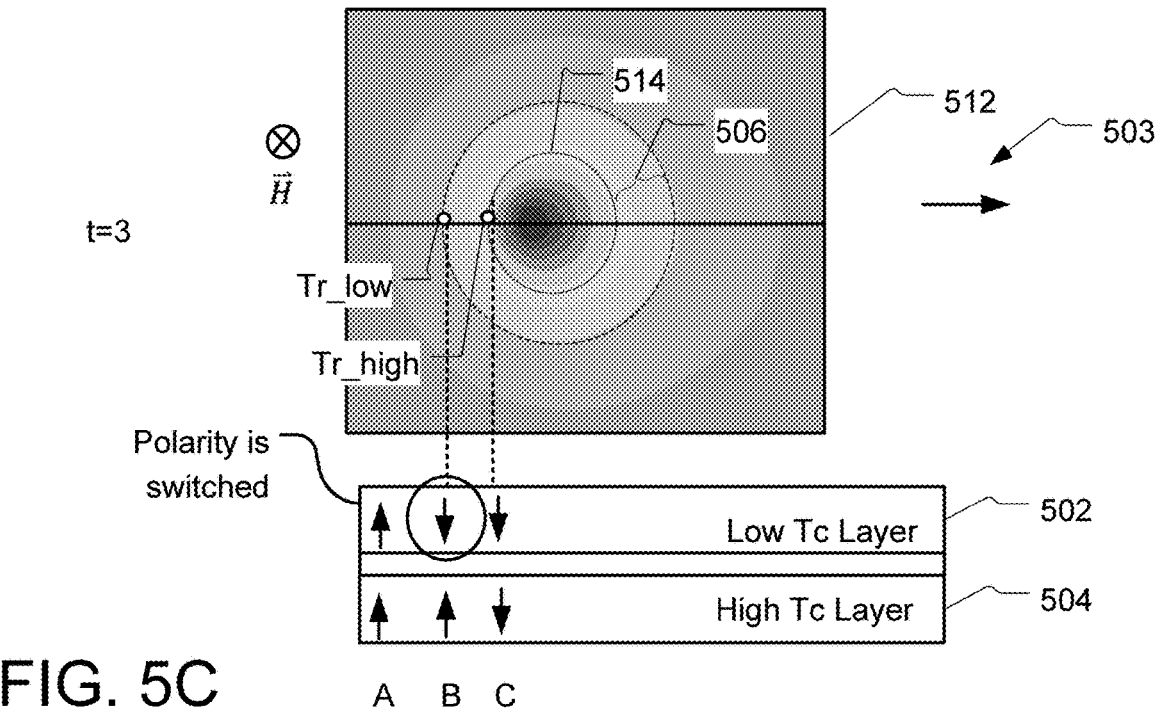
FIG. 5C illustrates a cross-sectional view of the media layers of FIG. 5A & FIG. 5B during a third example recording operation.

FIG. 5C illustrates a third example recording operation 503 following that of FIG. 5B. Here, the media has again rotated slightly such that read/write head has shifted in the down-track direction of the magnetic media, and the heat element is now positioned over another localized region "C." At this point in time, the direction of the applied write field is switched to a negative polarity. The region C, which is passing through the higher temperature zone 514, is magnetized (at Tr_high) such that grains in both the upper and lower layer are rotated to match the direction of the now-negative applied write field.

At this same point in time, the localized region "B" that was previously written per the operations illustrated in FIG. 5B is now passing through the lower temperature zone 506 of the thermal profile 512. The temperature of region "B" approaches Tr_low, which is sufficient to facilitate magnetic reversals in the low Tc layer 502 but not in the high Tc layer 504. Thus, at Tr_low, the grains in the upper layer of region "B" have the potential to be overwritten. Since the direction of the applied field has changed, the grains in the upper layer of region B are flipped from the positive direction to the negative direction (as shown) without affecting the polarity of grains in the high Tc layer 504. At this point in time, region A has positive polarity (e.g., a 1 bit value), region B has a net zero polarity (e.g., a 0 bit value), and region C has negative polarity (e.g., a −1 bit value).

Figure 5D:
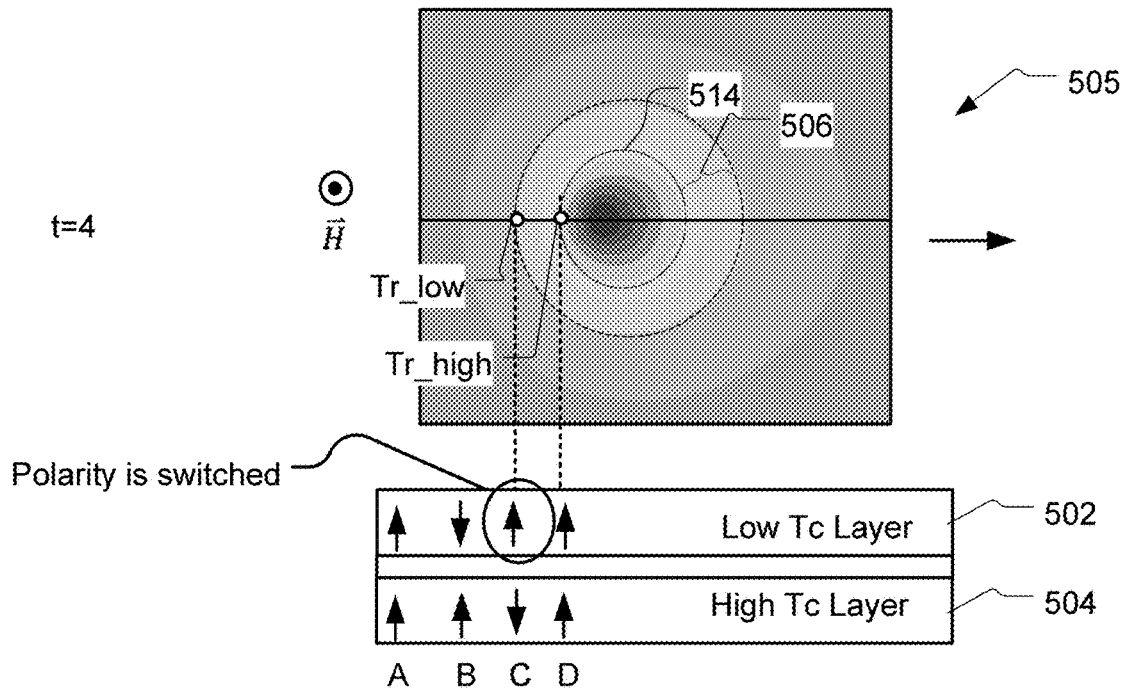
FIG. 5D illustrates a cross-sectional view of the media layers of FIGS. 5A-5C during a fourth example recording operation.

FIG. 5D illustrates a fourth example recording operation 505 following that of FIG. 5C. Here, the media has again rotated slightly such that read/write head has shifted in the down-track direction of the magnetic media, and the heat element is now positioned over another localized region "D." At this point in time, the direction of the applied write field is switched to from negative polarity back to positive polarity. The region D has just passed through the higher temperature zone 514 and is approaching the temperature Tr_high. Here, the grains in both the upper and lower layer are rotated to match the direction of the now-positive applied magnetic field.

At this same point in time, the localized region "C" that was previously written per the operations illustrated in FIG. 5C has passed through the lower temperature zone 506 and is approaching the temperature Tr_low, which is sufficient to facilitate magnetic reversals in the low Tc layer 502 but not in the high Tc layer 504. Thus, at this point in time, the grains in the upper layer of region "C" have the potential to be overwritten. Since the direction of the applied field has changed again relative to the field applied in FIG. 5C, the grains in the upper layer of region C are flipped from the negative direction to the positive direction (as shown) without affecting the polarity of the underlying grains in the high Tc layer 504. At this point in time, region A has position polarity (e.g., a 1 bit value), regions B and C have zero polarity (e.g., 0 bit values) and region D has positive polarity.

Figure 6A:
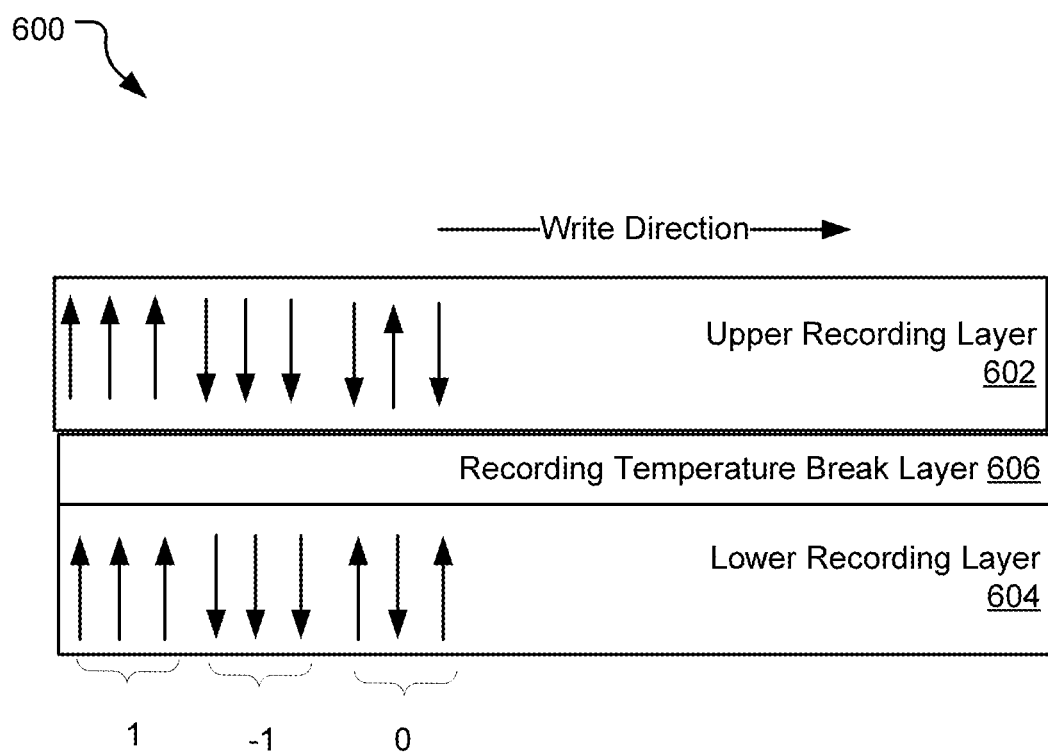
FIG. 6A illustrates still another example magnetic media suitable for writing regions of neutral polarity on a magnetic media.

FIG. 6A illustrates another example magnetic media 600 suitable for implementing the HAMR write techniques discussed with respect to FIG. 4 and FIGS. 5A-5D. The magnetic media 600 includes an upper recording layer 602 and a lower recording layer 604, each including soft magnetic material such as FePt or an alloy thereof. The upper recording layer 602 has a lower Curie temperature than the lower recording layer 604. The upper recording layer 602 is separated from the lower recording layer 604 by a recording temperature break layer 606. During the magnetic recording process, the recording temperature break layer 606 functions similar to the break layer 310 that described with respect to FIG. 3 in that it serves to decouple the upper recording layer 602 from the lower recording layer 604 during the recording process.

However, the break layer 310 of FIG. 3 differs from the recording temperature break layer 606 of FIG. 6 in composition and magnetic characteristics. Whereas the break layer 310 of FIG. 3 is a non-magnetic layer that provides decoupling at room temperature and recording temperatures of the HAMR device, the recording temperature break layer 606 is a magnetic layer with characteristics that cause the upper recording layer 602 to decouple from the lower recording layer 604 when heated to high temperatures during the recording process.

In one implementation, the recording temperature break layer 606 has a Curie temperature that is lower than either of the upper recording layer 602 and the lower recording layer 604. Because the high temperature HAMR recording process heats the magnetic media 600 to temperatures above the Curie temperature of the recording temperature break layer 606, this layer has no magnetic moment when magnetic recording is occurring. Consequently, magnetic reversals do not occur within the recording temperature break layer 606 during the recording process, and the recording temperature break layer 606 serves to completely decouple the upper recording layer 602 from the lower recording layer 604 when data is being written to the magnetic media.

However, unlike the break layer 310 of FIG. 3, the recording temperature break layer 606 provides some degree of coupling between the adjacent recording layers as the media cools down to room temperature. As cooling occurs, the anisotropy increases within the recording temperature break layer 606, causing it to couple to one of the adjacent recording layers. Thus, the recording temperature break layer 606 has a magnetic moment that aligns with one of the adjacent layers at room temperature.

In some implementations, the upper recording layer 602 and the lower recording layer 604 have identical Mrt (magnetic saturation times the layer thickness). In other implementations, the lower recording layer 604 is tuned to have a slightly higher Mrt than the upper layer to offset the decrease in readback signal contribution from this layer due to its greater separation from the read element. The upper recording layer 602 and the lower recording layer 604 each comprise a hard magnetic material (e.g., FePt) and may further include some amount of non-magnetic metal to selectively tune the Curie temperatures of the layers to a select range. Notably, the addition of non-magnetic metal (e.g., copper, nickel) serves to lower the Curie temperature of the layer. In this implementation, the recording temperature break layer 606 also comprises soft magnetic material (e.g., FePt) but has a higher amount of non-magnetic metal than the two recording layers such that the recording temperature break layer 606 has the lowest Curie temperature of the three layers.

The implementation of FIG. 6A provides several advantages over the implementation of FIG. 3. Since the recording temperature break layer 606 may include the same base magnetic material as the two recording layers, it serves as a good template for growth of the grains of the upper recording layer (e.g., FePt) and may, like the upper and lower recording layers, be granular such that it grows on magnetic grains in the lower layer with a 1:1 such that the boundaries between its are substantially aligned with the boundaries between grains in the lower recording layer 604. Consequently, the upper recording layer can then be grown such that its magnetic grain boundaries align between upper and lower layers (e.g., because the magnetic grains naturally align with underlying magnetic grains and the grains may be of the same size due to similarities in material composition). When looking at magnetic materials (FePt), these ideal characteristics are easier to satisfy than in non-magnetic materials. For these reasons, the implementation of FIG. 6A (with the magnetic layer between the recording layers) presents significant manufacturing advantages over the implementation of FIG. 3 (with the non-magnetic layer between the recording layers).

Figure 6B:
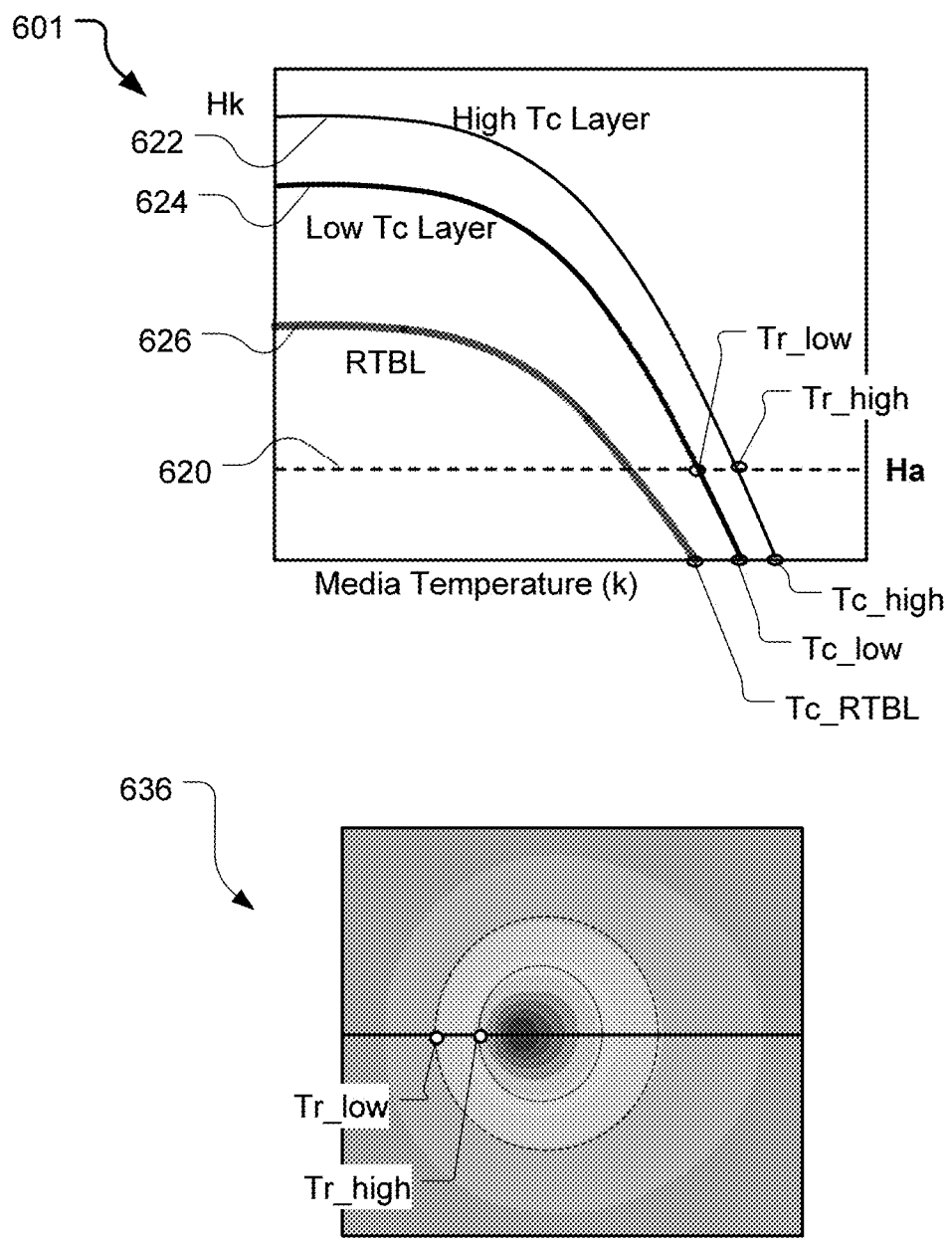
FIG. 6B illustrates an example plot showing thermal characteristics of a HAMR device with a magnetic media including the features described with respect to FIG. 6A.

FIG. 6B illustrates an example plot 601 and thermal profile 636 showing thermal characteristics of a HAMR device with a magnetic media including the features described with respect to FIG. 6A.

With reference first to the plot 601, a horizontal line 620 illustrates a magnitude of a write field (Ha) applied by the HAMR write element as the layers of the media undergo changes in magnetic anisotropy and temperature. A first line 622 illustrates anisotropy (Hk) v. temperature trends for the lower recording layer 604 with highest Curie temp. This layer has a Curie temperature labeled "Tc_high." A second line 624 illustrates Hk v. temperature trends for the upper recording layer 602. This layer has a Curie temperature labeled as "Tc_low" that is lower than the that of the lower recording layer 604. Another line 626 illustrates Hk v. temperature trends for the recording temperature break layer 606. This layer has a Curie temperature labeled as "RTBL_Tc" that is lower than the Curie temperatures of either of the adjacent recording layers.

For each of the upper recording layer (line 622) and the lower recording layer (line 624), there exists a narrow temperature range in which magnetic reversals can occur in the presence of an applied magnetic field (Ha). In the illustrated example, magnetic reversals are possible for the lower recording layer (the higher Tc layer) between Tc_high and Tr_high, while magnetic reversals are possible for the upper recording layer (the lower Tc layer) between Tr_low and Tc_low). The Curie temperature of the recording temperature break layer 606 (Tc_RTBL) is below Tr_low and therefore outside of the temperature range where magnetic reversals may be realized in either of the recording layers. Consequently, magnetic reversals do not occur in the recording temperature break layer 606 during the recording process.

Figure 6C:
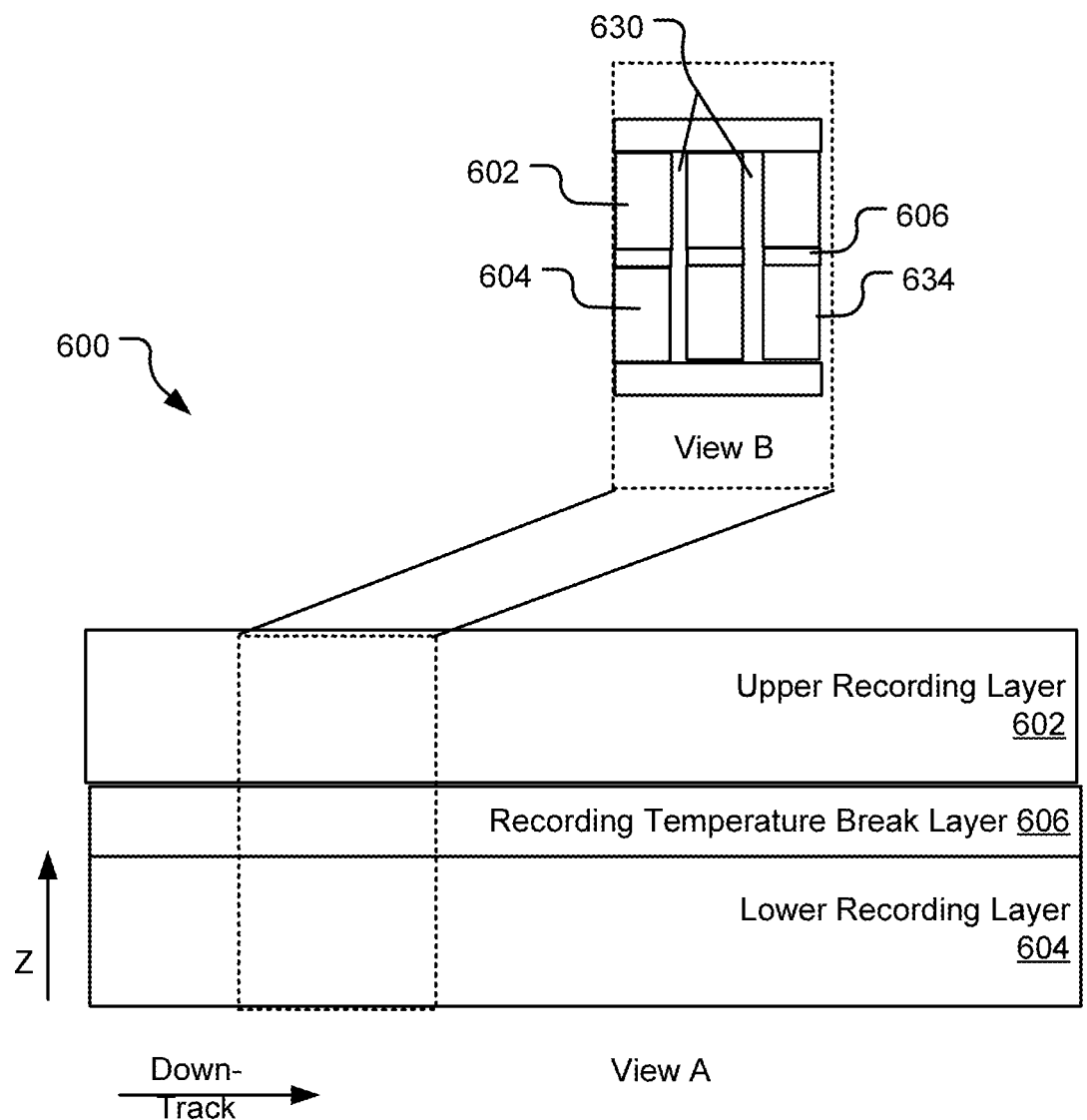
FIG. 6C illustrates the magnetic media of FIG. 6A with additional detail.

FIG. 6C illustrates the recording media 600 of FIG. 6A, and further includes a magnified view (View B) illustrating 1:1:1 granular alignment within the three different magnetic layers. The lower recording layer 604 includes individual magnetic grains (e.g., a grain 634) that are aligned with grains in the recording temperature break layer 606 that are further aligned with grains in the upper recording layer 602. Non-magnetic segregant 630 separates each adjacent pair of magnetic grain from one another in the down-track and cross-track directions of the magnetic media. Notably, the grains in the recording temperature break layer 606 are not as tall as in the two adjacent layers because this layer is thinner. In one implementation, the recording temperature break layer 606 has a thickness that is about 25% or less than that of the upper recording layer 602 and the lower recording layer 604. According to one implementation, the upper recording layer 602, the lower recording layer 604, and the recording temperature break layer 606 have Mrt values (magnetic saturation times thickness) that are, in combination, detected as substantially zero amplitude by the read element.

Figure 7:
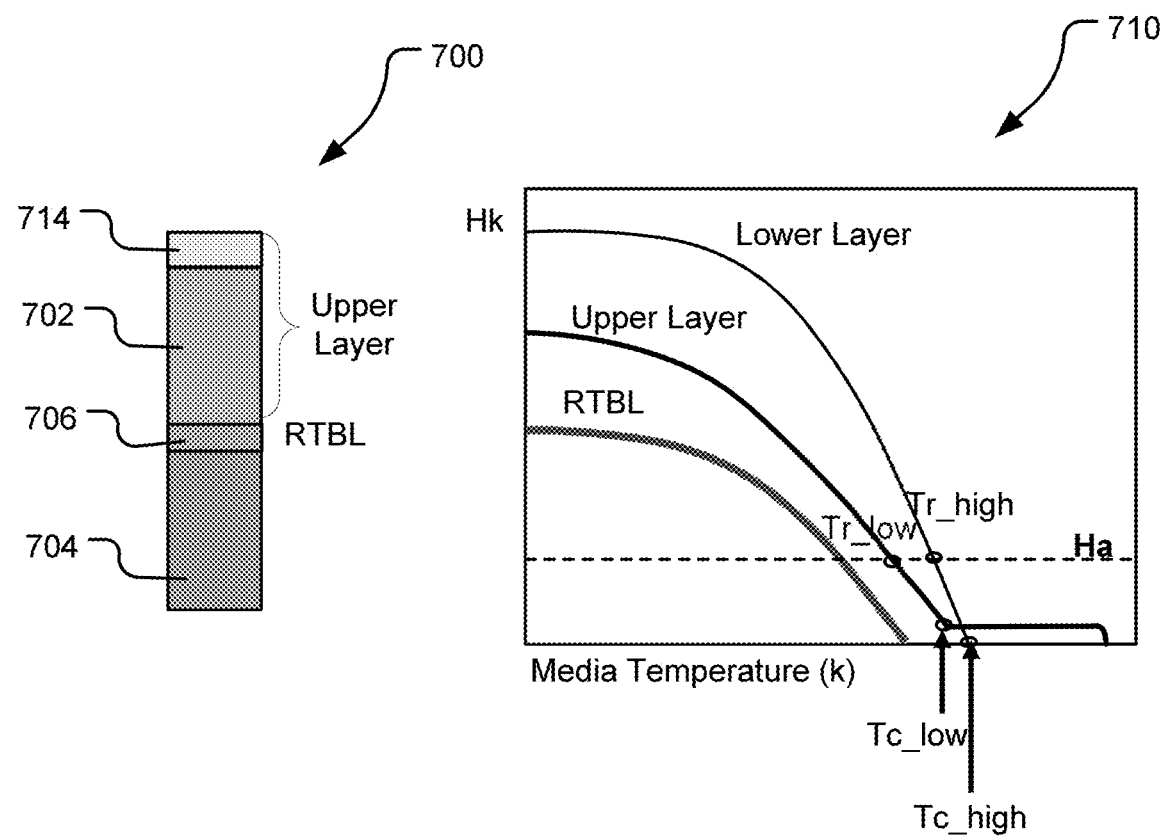
FIG. 7 illustrates a cross-sectional portion of another example magnetic media suitable for implementing the HAMR write techniques for creating regions of neutral polarity.

FIG. 7 illustrates a cross-sectional portion of another example magnetic media 700 suitable for implementing the HAMR write techniques for creating regions of zero state polarity. The media 700 includes a lower recording layer 704, an upper recording layer 702, and a recording temperature break layer (RTBL) 706 between the two layers.

Magnetic anisotropy (Hk) v. temperature trends for various layers of the magnetic media 700 are shown in plot 710. A Curie temperature (Tc_high) of the lower recording layer is higher than a Curie temperature (Tc_low) of the upper recording layer 702, and a Curie temperature (RTBL_Tc) of the recording temperature break layer 706 is lower than the Curie temperature of either of the recording layers 702 or 704 and lower than the recording temperatures Tr_low of the low Tc layer. Other characteristics of the upper recording layer 702, lower recording layer 704, or recording temperature break layer 706 may be the same or similar to corresponding layers described above with respect to FIGS. 6A-6C. The implementation of FIG. 7 differs from that of FIGS. 6A-6C in that the magnetic media 700 additionally includes a CGC capping layer 714 on top of the upper recording layer 702.

The upper layer Hk vs. temperature response shown in 710 is the combined response of layer 702 and 714. In general, CGC capping layer 714 functions to reduce coercivity of the upper recording layer composite. One consequence of this reduced coercivity is that the difference between Curie temperatures of the recording layers 702, 704 can be reduced while preserving the same difference between the recording temperatures (Tr_low and Tr_high in FIG. 6B) used to write to the two recording layers within the HAMR system described with respect to FIGS. 6A-6C. This is advantageous from a processing standpoint because a smaller alteration in the Curie temperature results in better growth FePt alloy.

Figure 8:
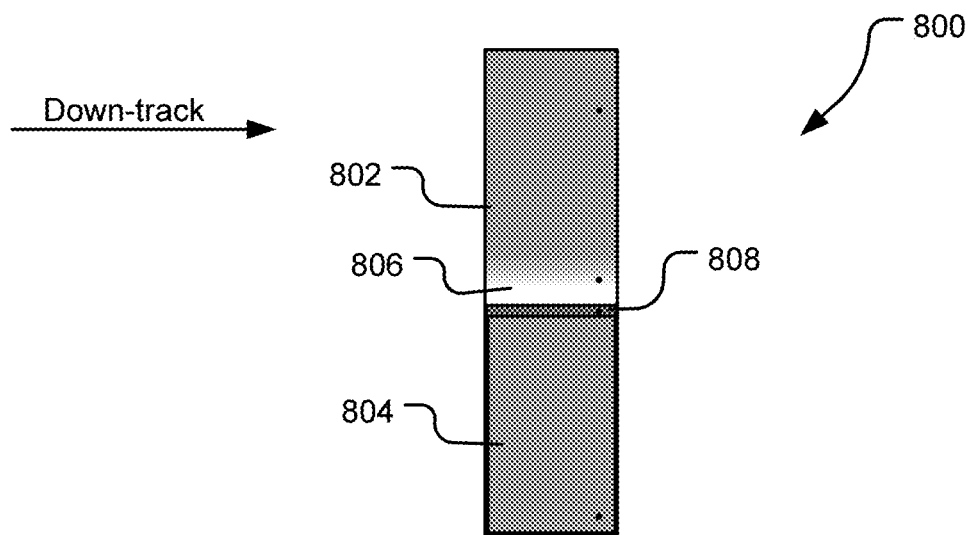
FIG. 8 illustrates a cross-sectional portion of still another example magnetic media suitable for implementing HAMR write techniques for creating regions of neutral polarity.

FIG. 8 illustrates a cross-sectional portion of another example magnetic media 800 suitable for implementing the HAMR write techniques for creating regions of zero state polarity. The media 800 includes some of the same characteristics as the magnetic media 600 of FIG. 6A including an upper recording layer 802 with a lower Curie temperature than a lower recording layer 804. The upper recording layer 802 is separated from the lower recording layer 804 by a recording temperature break layer 806, which may be understood as having the same or substantially the same characteristics as the recording temperature break layer described with respect to FIGS. 6A-6C. Depending upon the thermal characteristics of the select material(s) included within the recording temperature break layer 806, this layer may be prone to mixing with the magnetic material (FePt) in the adjacent recording during high temperature deposition steps of the media formation process. This "mixing" of material in adjacent layers is referred to as interlayer diffusion. Depending on the severity of this effect, the recording temperature break layer 806 may lose some of its magnetic characteristics—mainly, its ability to fully decouple the upper recoding layer 802 from the lower recording layer 804 during the high temperature recording process. In addition, if the RTBL thickness is broadened due to interlayer diffusion, the magnetization breaking position is not well defined. To help mitigate interlayer diffusion, the magnetic media 800 includes a diffusion barrier layer 808 between the recording temperature break layer 806 and the lower recording layer 804.

In one implementation, the diffusion barrier layer 808 has a base material with low solubility in FePT and/or L10 lattice constants to promote L10 grain growth of subsequent layers. For example, the diffusion barrier layer 808 may be a metal granular material that includes a metal alloy (e.g., Ru or other metallic alloys such as RuPt or metallic alloy with segregant material, such as any combination or mix of oxides, nitrides, carbon, or silicon).

Figure 9:
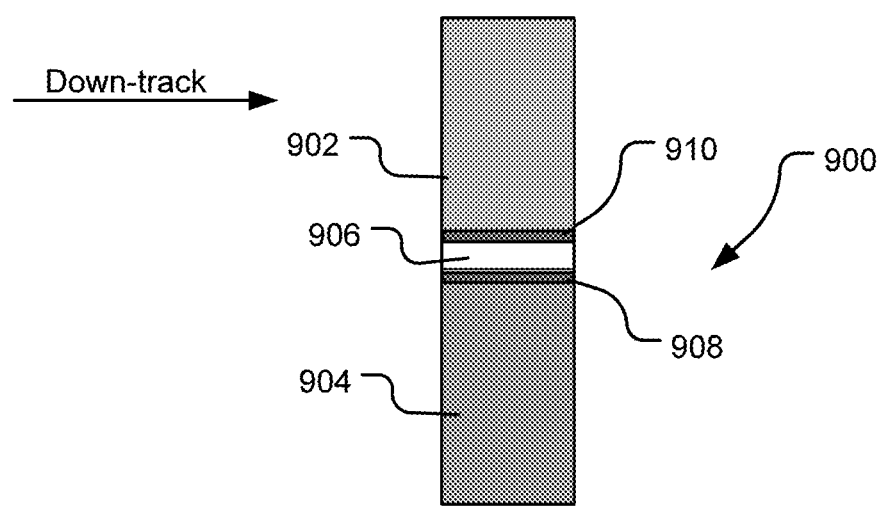
FIG. 9 illustrates a cross-sectional portion of yet another example magnetic media suitable for implementing HAMR write techniques for creating regions of neutral polarity.

FIG. 9 illustrates yet another example magnetic media 900 suitable for implementing the HAMR write techniques for creating regions of zero state polarity. Like the implementation of FIG. 8, the magnetic media 900 includes an upper recording layer 902 separated from a lower recording layer 904 by a recording temperature break layer 906. In this implementation, there exist two diffusion barrier layers 908, 910, on opposite sides of the recording temperature break layer 906. The diffusion break layers 908, 910 may have the same or similar characteristics as those described above with respect to FIG. 8. The use of dual diffusion break layers 908, 910 serves to further ensure that the fully decoupled recording temperature break layer 906 provides consistent decoupling between the upper recording layer 902 and the lower recording layer 904 and ensures that the break location is precisely within the confines of the thickness of the recording temperature break layer 906.

Figure 10:
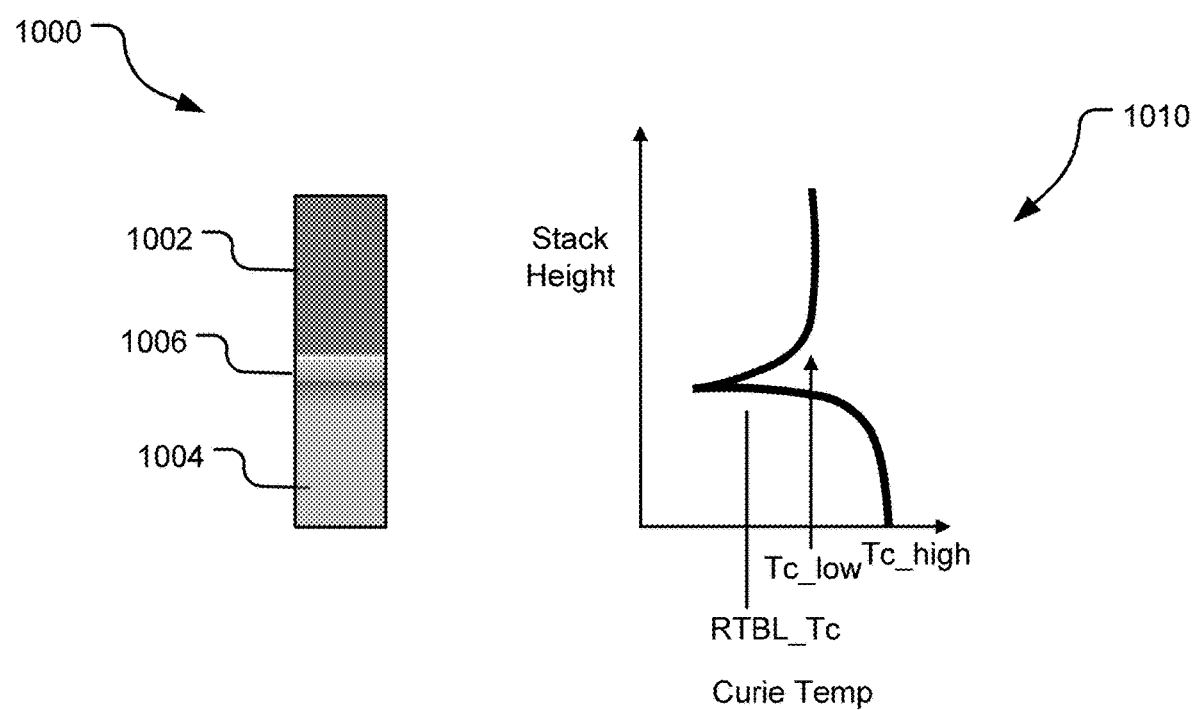
FIG. 10 illustrates a cross-sectional portion of yet another example magnetic media suitable for implementing the HAMR write techniques for creating regions of neutral polarity and a plot of temperature characteristics for the media.

FIG. 10 illustrates a cross-sectional portion of another example magnetic media 1000 suitable for implementing the HAMR write techniques for creating regions of zero state polarity. Temperature characteristics of the magnetic media 1000 are shown in plot 1010. The media 1000 includes a lower recording layer 1004 with a first Curie temperature, Tc_high, that is higher than a Curie temperature, Tc_low, of an upper recording layer 1002. The upper recording layer 1002 is separated from the lower recording layer 1004 by a recording temperature break layer 1006 that has a Curie temperature, RTBL_Tc, that is lower than the Curie temperature of either the upper recording layer 1002 or the lower recording layer 1004.

In FIG. 10, the recording temperature break layer 1006 is, for example, a flash of metal (e.g., Cu, Ni, Ru) or metal with segregant that diffuses into the upper recording layer 1002 and the lower recording layer 1004 during the high temperature deposition of the upper recording layer 1002. Due to this diffusion, the Tc values of the upper recording layer 1002 and the lower recording layer 1004 are lowered near the interface with the recording temperature break layer 1006, as shown by the plot 1010.

As long as at least a portion of the recording temperature break layer 1006 retains a Curie temperature of RTBL_Tc lower than the recording temperatures Tr_low, 1006 still functions to decouple the upper recording layer 1002 from the lower recording layer 1004 during the recording process.

This implementation leverages diffusion, rather than trying to prevent it (as in FIGS. 7-8), and therefore does not require a diffusion barrier layer that can, in some cases, impede growth of the upper recording layer.

According to one implementation, the recording temperature break layer 1006 is a very thin flash metal layer (e.g., sub 1 nm), which is thin enough to diffuse into the upper and lower layer and not impede the L10 growth and consistent grain orientation in the upper recording layer.

Figure 11:
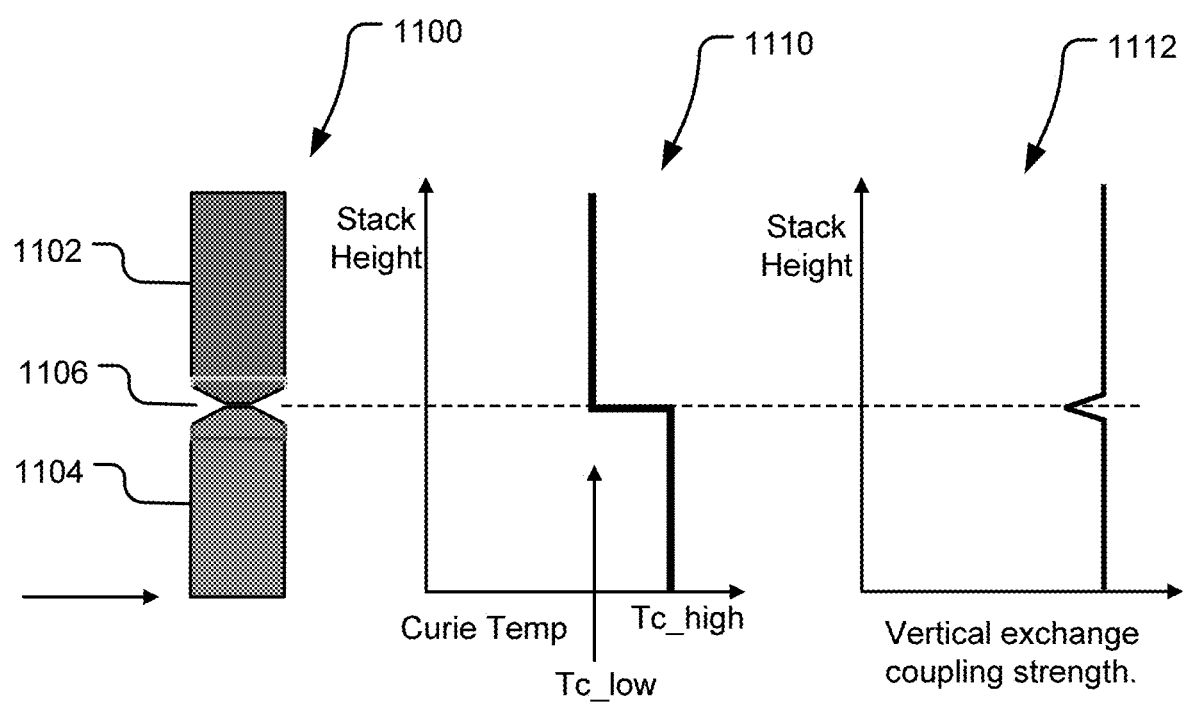
FIG. 11 illustrates a cross-sectional portion of still another example magnetic media suitable for implementing the HAMR write techniques for creating regions of neutral polarity, a plot of temperature characteristics for the media, and the exchange coupling characteristics for the media.

FIG. 11 illustrates a cross-sectional portion of another example magnetic media 1100 suitable for implementing the HAMR write techniques for creating regions of zero state polarity. Temperature characteristics of the magnetic media 1100 are shown in plot 1110. The media 1100 includes a lower recording layer 1104 with a first Curie temperature, Tc_high, that is higher than a second Curie temperature, Tc_low, of an upper recording layer 1102. In this implementation, an interface region 1106 between the lower recording layer 1104 and the upper recording layer 1102 has a same base material (e.g., FePt) as the recording layers, but an increase in the amount of non-magnetic segregant.

As shown in plot 1112, the increased segregant in the interface region 1106 weakens the exchange coupling between the recording layers 1102 and 1104, allowing the upper recording layer 1102 to magnetically transition independent of the lower recording layer 1104 as described elsewhere herein, such as with respect to FIGS. 6A-6C. A benefit to this implementation is that the interface region 1106 is easy to implement and the material of this interface region 1106 does not need to be modified to provide a significant change in its Curie temperature relative to the Curie of the recording layers 1102 and 1104.

Figure 12:
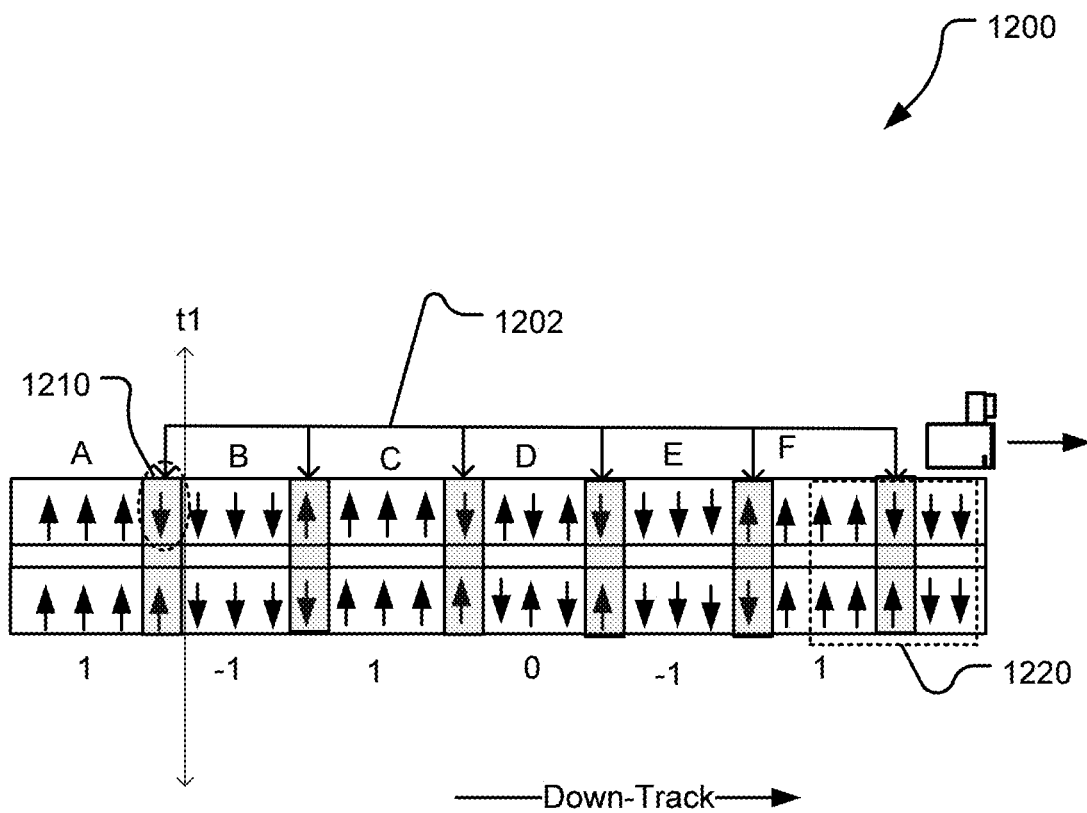
FIG. 12 illustrates another example portion of a magnetic media that has been encoded with regions of neutral polarity.

FIG. 12 illustrates another example portion of a magnetic media that has been encoded with regions of neutral polarity per any of the techniques discussed above with respect to any of FIGS. 3-11. In FIG. 12, regions of the media labeled A, B, C, D, E, F are each of substantially similar size and correspond to an individual data bit. Regions A, C, and F have positive polarity and correspond to logical bits in the '1' state; regions B and E have negative polarity and correspond to logical bits in the '−1' state; and region D has zero state (neutral) polarity, corresponding to a logical bit in the '0' state.

Notably, the zero state shown in region D has been achieved by toggling the polarity of the write field between positive and negative (a technique known as an AC erase) while the heat element is on and with the upper and lower layers transitioning in response to the changing field as generally described with respect to FIGS. 5A-5D.

An interesting effect of the above-described dual-magnetic-layer single pass write of three logical states is that this technique forms boundary regions of neutral polarity (e.g., neutral polarity transition zones 1202) between each pair of data bits of different polarity. This is because each change to the magnetic orientation of the write field causes a recently-recorded region in the upper layer to be overwritten to match the new orientation of the write field. This effect occurs even when a zero state data bit is not being written. For example, the write field is in the positive direction while writing data bit A up until the time t1, when the write element is about to begin writing data bit B. At t1, the write field is switched from positive to negative and, consequently, a previously-written magnetic region 1210 is overwritten and switched from the previously-written positive state to match the now-negative write field. A similar effect occurs when the write element switches the write field polarity between the writing of negative polarity data bit B and positive polarity data bit C.

Notably, the neutral polarity transition regions are each of a substantially same size, which is smaller in width than that of each data bit. The size of the neutral polarity transition regions depends upon the characteristics of the thermal profile created by a heat element of the recording head. For example, the width of each neutral polarity transition region may depend on characteristics of the NFT on the write head, the thermal gradient at the transition zone, and the difference in recording temperature of the two recording layers. In one implementation, the neutral polarity transition regions have a down-track direction cross section that is about half the average grain size, or between about half the average grain size and the whole grain size.

Notably, the neutral polarity transition regions may be formed between +1 and −1 data bit boundaries regardless of whether or not the HAMR device actually writes any data bits in the zero state (e.g., such as data bit D). Thus, the media and HAMR devices and respective characteristics discussed above with respect to FIG. 5A-5D may, in some implementations, be utilized to facilitate standard (e.g., 2-state) conventional recording with neutral polarity transition regions. Inclusion of the neutral polarity transition regions in HAMR devices has been shown to improve signal-to-noise significantly, such as by as much as 3 dB media SNR.

Figure 13:
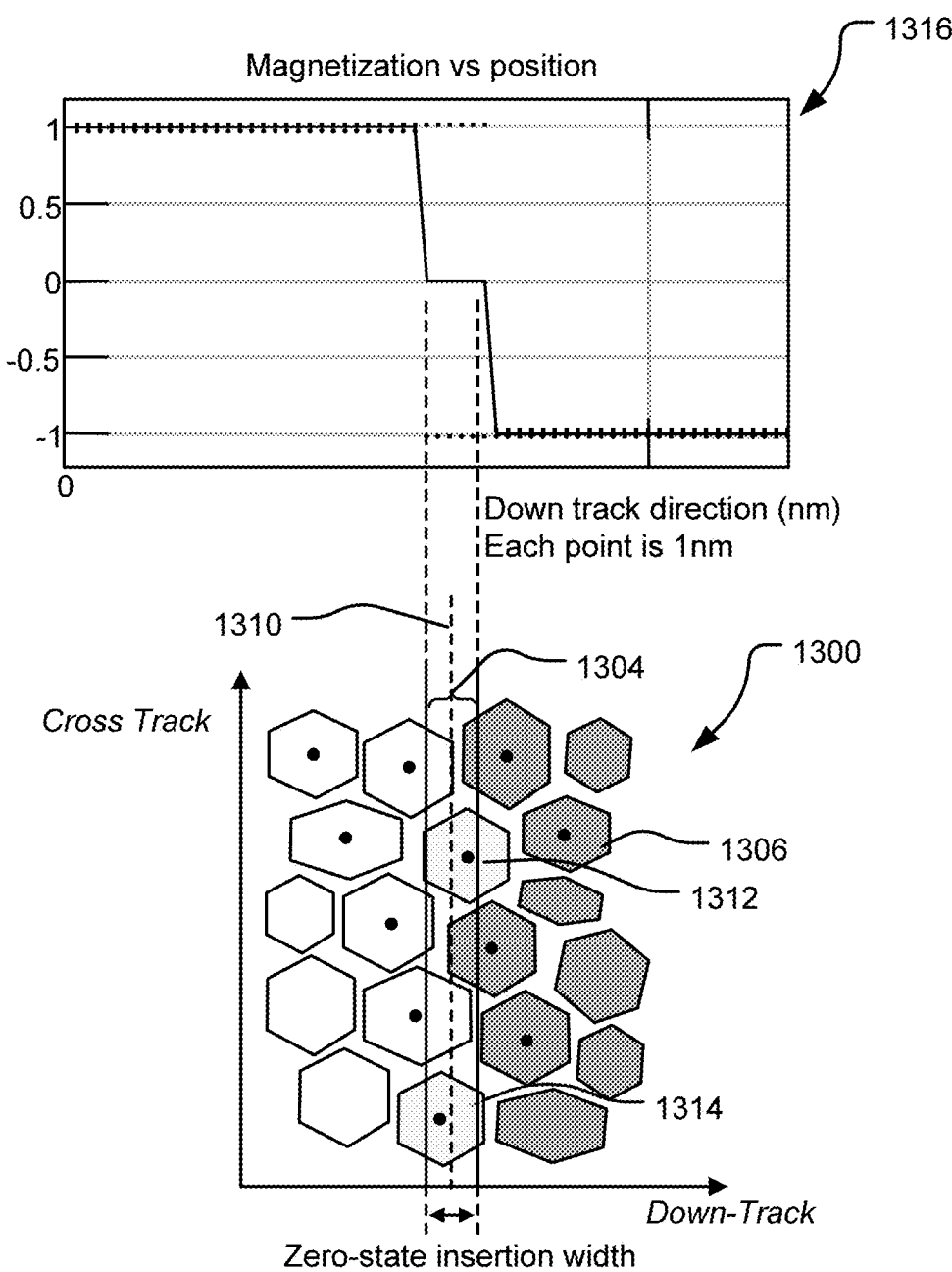
FIG. 13 illustrates a top-down view of example magnetic grains, including some grains of neutral polarity, on a magnetic media that flies beneath a read/write head in a HAMR device.

To further illustrate structural detail of the neutral polarity transition zones 1202, FIG. 13 illustrates a top-down view of a portion of a media that may, for example, correspond to a region 1220 in FIG. 12.

Specifically, FIG. 13 is a top-down view illustrating example magnetic grains that form the magnetic media 1300. The magnetic media 1300 has dual layers of recording material with different Curie temperatures and magnetic characteristics that facilitate some magnetic reversals in both recording layers simultaneously while isolating other magnetic reversals to a single one of the recording layers as, for example, is discussed with respect to any of FIG. 3 through FIG. 12.

The shade of the grain illustrated for each magnetic grain represents the net polarity of the upper and lower layer grain. The white represents a net negative −1 polarity grain and dark gray represents a net positive +1 polarity grain. The medium grey represents a net zero polarity grain.

The dashed line 1304 corresponds the ideal transition position between the negative −1 bit to the positive +1 bit. In a perfect (noiseless) recording device employing conventional HAMR techniques, the transition center 1310 would provide a crisp boundary between positive grain bits and negative grain bits. However, due to the granular nature and random position of the grains that form the recording media, the transition center 1310 is not a crisp division—rather, the transition is formed between discrete grain boundaries.

Some of the grains of positive polarity "bleed" across the transition center 1310 to the positive polarity side and some of the grains of negative polarity bleed across the transition center 1310 to the negative polarity side. This bleeding effect leads to a deviation from the ideal transition, known as "transition jitter." In the illustrated case where some of the grains have been shifted to neutral polarity in the transition region 1304, the effect of transition jitter is significantly reduced. Notably, the grains that are shifted to neutral polarity (e.g., 1312, 1314) are the grains with its centroid position that lay close to the transition. Since grain edges contribute to the transition position, these neutral grains with centers near the transition would contribute most to the jitter if their polarity was not neutral.

Any grains having its centroid position within the width of the transition region 1304 will result in a neutral polarity. This region is referred to herein as the "zero-state insertion width." This zero-state insertion width depends on the difference in recording temperature of the two layers (e.g., difference between Tr_high and Tr_low as shown in the plot of FIG. 6B), as well as the thermal gradient at the transition zone. Mathematically, the zero state insertion width is given by the temperature difference between Tr_high and Tr_low divided by the thermal gradient across the transition zone. According to one implementation that provides excellent reduced-jitter performance (maximizing SNR in the transition zones), the zero-state transition width is between about 0.5 and 1 times the average grain diameter or center-to-center spacing of adjacent grains.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A method of encoding three different logical states in a magnetic storage media having a dual recording layer including an upper recording layer and a lower recording layer, the method comprising:

encoding a first logical state on the magnetic storage media by fixing magnetic grains in a first localized region of an upper recording layer and in a lower recording layer to assume a first polarity;

encoding a second logical state on the magnetic storage media by fixing magnetic grains in a second localized region of the upper recording layer and in the lower recording layer to assume a second polarity opposite the first polarity;

encoding a third logical state by fixing each of a plurality of magnetic grains in the upper recording layer of a third localized region to have a polarity opposite a polarity of a corresponding underlying grain in the lower recording layer of the third localized region by switching off a write field while heating the third localized region with a laser.

2. The method of claim 1, wherein the upper recording layer and the lower recording layer are separated by a weak anti-ferromagnetic coupling layer.

3. The method of claim 1, wherein the upper recording layer has a lower Curie temperature than the lower recording layer.

4. The method of claim 3, wherein heat generated by an NFT on a recording head is characterized by a thermal profile that moves in a down-track direction relative to the magnetic media while data is being written, the thermal profile having:

a higher temperature zone that at least partially underlies the NFT, the higher temperature zone heating the magnetic media to a temperature that facilitates magnetic reversals in both the upper recording layer and the lower recording layer;

a lower temperature zone that is offset from the higher temperature zone in a down-track direction, the lower temperature zone of the thermal profile heating the media to a temperature that is too low to facilitate magnetic reversals in the lower recording layer but in a range sufficient to facilitate magnetic reversals in the upper recording layer.

5. The method of claim 4, wherein encoding the third logical state in the third localized region further comprises at least:

applying a magnetic field of a first polarity while a portion of the third localized region is within the higher temperature zone; and subsequently applying a magnetic field of a second opposite polarity when an NFT has moved down-track of the third localized region and while a portion of the third localized region is within the lower temperature zone of the thermal profile.

6. The method of claim 5, wherein applying the magnetic field of the first polarity and second opposite polarity further comprises:

rapidly alternating polarity of the magnetic field multiple times as the thermal profile moves over the third localized region.

7. The method of claim 3, wherein the first recording layer and the second recording layer are separated by a break layer that is non-magnetic.

8. The method of claim 4, wherein the first recording layer and the second recording layer are separated by a break layer that is weakly ferromagnetic and that has a Curie temperature layer below a temperature range of both the higher temperature zone and the lower temperature zone such that the thermal profile of the NFT does not facilitate magnetic reversals in the break layer.

9. The method of claim 8, wherein the break layer fully decouples the first recording layer from the second recording layer when heated during writes to the magnetic media.

10. A storage device comprising:

a magnetic storage media including an upper recording layer and a lower recording layer, the storage media encoding a plurality of data bits, each data bit including magnetic grains stacked in the lower recording layer and the upper recording layer;

a controller configured to control a read/write head and a heat element to encode three different logical states on the magnetic media on a single pass of the read/write head, the controller being configured to:

encode a first logical state in a first localized region bit by fixing magnetic grains in the upper recording layer and in the lower recording layer of the first localized region to assume a first polarity;

encode a second logical state in a second localized region by fixing magnetic grains in the upper recording layer and in the lower recording layer of the second localized region to assume a second polarity opposite the first polarity; and encode a third logical state in a third localized region by fixing each of a plurality of magnetic grains in an upper layer of the data bit to have a polarity opposite a polarity of a corresponding underlying grain in the lower recording layer of the third localized region, the controller encoding the third logical state by switching off a write field while a laser is on and heating the third localized region.

11. The storage device of claim 10, wherein the upper recording layer and the lower recording layer are separated by a weak AFC coupling layer.

12. The storage device of claim 10, wherein the upper recording layer has a lower Curie temperature than the lower recording layer and wherein the upper recording layer and the lower recording layer are separated by a break layer that magnetically decouples the upper recording layer from the lower recording layer during when data is being written to the magnetic storage media.

13. The storage device of claim 10, wherein the read/write head includes an NFT that generates a thermal profile that moves along a data track when data is being written, the thermal profile having:

a higher temperature zone that at least partially underlies the NFT, the higher temperature zone heating the magnetic storage media to a temperature that facilitates magnetic reversals in both the upper recording layer and the lower recording layer;

a lower temperature zone that is offset from the higher temperature zone in a down-track direction, the lower temperature zone of the thermal profile heating the media to a temperature that is too low to facilitate magnetic reversals in the lower recording layer but in a range sufficient to facilitate magnetic reversals in the upper recording layer.

14. The storage device of claim 13, wherein the controller is configured to encode the third logical state in the third localized region by a series of operations including:

applying a magnetic field of the first polarity while a portion of the third localized region is within the higher temperature zone; and subsequently applying a magnetic field of a second opposite polarity when the NFT has moved down-track of the third localized region and while a portion of the third localized region is within the lower temperature zone of the thermal profile.

15. The storage device of claim 14, wherein applying the magnetic field of the first polarity and second opposite polarity further comprises:

rapidly alternating the polarity of the magnetic field multiple times as the thermal profile moves over the third localized region.

16. The storage device of claim 13, wherein the first recording layer and the second recording layer are separated by a break layer that is non-magnetic.

17. The storage device of claim 16, wherein the recording layer and the second recording layer are separated by a break layer that is weakly ferromagnetic and that has a Curie temperature layer below a temperature range of both the higher temperature zone and the lower temperature zone such that the thermal profile of the NFT does not facilitate magnetic reversals in the break layer.

18. One or more non-transitory computer-readable storage media encoding processor-executable instructions for encoding three different logical states in a magnetic storage media on a single pass of a read/write head, the processor-executable instructions being executable to:

encode a first logical state on the magnetic storage media by fixing magnetic grains in a first localized region of an upper recording layer and in a lower recording layer to assume a first polarity;

encode a second logical state on the magnetic storage media by fixing magnetic grains in a second localized region of the upper recording layer and in the lower recording layer assume a second polarity opposite the first polarity;

encode a third logical state by fixing each of a plurality of magnetic grains in the upper recording layer of a third localized region to have a polarity opposite a polarity of a corresponding underlying grain in the lower recording layer of the third localized region by switching off a write field while heating the third localized region with a laser.

19. The one or more non-transitory computer-readable storage media of claim 18, wherein the upper recording layer and the lower recording layer are separated by a weak AFC coupling layer.

20. The one or more non-transitory computer-readable storage media of claim 18, wherein heat generated by an NFT on the read/write head is characterized by a thermal profile that moves along a data track of the magnetic storage media while data is being written, the thermal profile having:

a higher temperature zone that at least partially underlies the NFT, the higher temperature zone heating the magnetic storage media to a temperature that facilitates magnetic reversals in both the upper recording layer and the lower recording layer, the upper recording layer having a lower Curie temperature than the lower recording layer a lower temperature zone that is offset from the higher temperature zone in a down-track direction, the lower temperature zone of the thermal profile heating the media to a temperature that is too low to facilitate magnetic reversals in the lower recording layer but in a range sufficient to facilitate magnetic reversals in the upper recording layer.

* * * * *